US007802232B2

(12) United States Patent
Zorn et al.

(10) Patent No.: US 7,802,232 B2
(45) Date of Patent: Sep. 21, 2010

(54) SOFTWARE ROBUSTNESS THROUGH SEARCH FOR ROBUST RUNTIME IMPLEMENTATIONS

(75) Inventors: Benjamin G. Zorn, Woodinville, WA (US); Emery D. Berger, Amherst, MA (US)

(73) Assignee: Microsoft Corporation, Redmond, WA (US)

( * ) Notice: Subject to any disclaimer, the term of this patent is extended or adjusted under 35 U.S.C. 154(b) by 1198 days.

(21) Appl. No.: 11/396,040

(22) Filed: Mar. 31, 2006

(65) Prior Publication Data

US 2007/0234297 A1 Oct. 4, 2007

(51) Int. Cl.
G06F 9/44 (2006.01)
(52) U.S. Cl. .................... 717/124; 717/131; 714/38; 714/39
(58) Field of Classification Search .............. None
See application file for complete search history.

(56) References Cited

U.S. PATENT DOCUMENTS

| 7,539,903 | B2 | 5/2009 | Kolb et al. | |
| 2004/0221273 | A1 | 11/2004 | Sandham et al. | |
| 2006/0095444 | A1 | 5/2006 | Nadj et al. | |
| 2008/0295071 | A1* | 11/2008 | Schellekens | 717/106 |
| 2009/0055674 | A1 | 2/2009 | Mueller et al. | |

OTHER PUBLICATIONS

Avizienis, et al., "The N-version approach to fault-tolerant systems", *IEEE Transactions on Software Engineering*, 11(12), pp. 1491-1501, Dec. 1985.

Hicks, et al., Experience with Safe Manual Memory-Management in Cyclone, pp. 1-14, *Science of Computer Programming*, 2006.

Livshits et al., "Finding Security Vulnerabilities in Java Applications with Static Analysis", 14th USENIX Security Symposium, pp. 271-286, Aug. 2005.

Austin, et al., "Efficient Detection of All Pointer and Array Access Errors", *PLDI '94: Proceedings of the ACM SIGPLAN 1994 Conference on Programming Language Design and Implementation*, pp. 290-301, 1994, ACM Press.

Avots, et al., "Improving Software Security with a C Pointer Analysis", in *ICSE '05: Proceedings of the 27th International Conference on Software Engineering*, pp. 332-341, St. Louis, MO, May 15-21, 2005.

(Continued)

*Primary Examiner*—Chuck O Kendall
(74) *Attorney, Agent, or Firm*—Klarquist Sparkman, LLP

(57) ABSTRACT

Software program robustness is improved by successfully masking memory safety errors in the software program. For instance, at least some memory safety errors in a software program can be masked by using a runtime memory manager that approximates the semantics of an infinite heap memory manager. In one example, an approximation of an infinite heap memory manager is implemented by configuring a parameterized memory manager with parameter values such as padding to be added to each allocation on the heap and the amount of deferment before executing a call to free memory on the heap. Ideal configurations balance expected robustness with costs such as added memory and processing time. Ideal configurations can be identified through systematic search of a coordinate space of selected parameters. Ideal configurations can also be identified by statistically correlating success/failure data collected from execution of deployed instances of the software program to the configuration of the memory managers used therein.

26 Claims, 14 Drawing Sheets

OTHER PUBLICATIONS

Ball, et al., "Parameterized Verification of Multithreaded Software Libraries", Dec. 2000, in *7th International Conference on Proceedings of Tools and Algorithms for the Construction and Analysis of Systems (TACAS)*, vol. 2031 of Lecture Notes in Computer Science, pp. 158-173, 2001.

Berger, "Hoard: A Scalable Memory Allocator for Multithreaded Applications", In *ASPLOS-IX: Ninth International Conference on Architectural Support for Programming Languages and Operating Systems*, pp. 117-128, Nov. 2000.

Berger, et al., "Composing High-Performance Memory Allocators", In *Proceedings of the 2001 ACM SIGPLAN Conference on Programming Language Design and Implementation (PLDI)*, pp. 1-12, *ACM Press*, Snowbird, Utah, Jun. 2001.

Bhatkar, et al., "Address Obfuscation: An Efficient Approach to Combat a Broad Range of Memory Error Exploits", In *Proceedings of the 12th USENIX Security Symposium*, pp. 105-120, USENIX, Aug. 2003.

Bhatkar, et al., Efficient Techniques for Comprehensive Protection from Memory Errors Exploits, In *Proceedings of the 14th USENIX Security Symposium*, pp. 271-286, USENIX, Aug. 2005.

Boehm, et al., "Garbage Collection in an Uncooperative Environment", *Software Practice and Experience*, 18(9):807-820, John C. Wiley & Sons, 1988.

Dhurjati, et al., "Memory Safety Without Runtime Checks or Garbage Collection", In *ACM SIGPLAN 2003 Conference on Languages, Compilers, and Tools for Embedded Systems (LCTES '2003)*, Jun. 2003, *ACM Press*.

Feng, et al., "A Locality-improving Dynamic Memory Allocator", In *Proceedings of the ACM SIGPLAN 2005 Workshop Memory System Performance (MSP)*, Jun. 2005, *ACM Press*.

Grossman, et al., "Region-based Memory Management in Cyclone", In *PLDI '02: Proceedings of the ACM SIGPLAN 2002 Conference on Programming Language Design and Implementation*, pp. 282-293, 2002, *ACM Press*.

Grunwald, et al., "Improving the cache locality of memory allocation", In *Proceedings of SIGPLAN '93 Conference on Programming Languages Design and Implementation*, vol. 28(6) of *ACM SIGPLAN Notices*, pp. 177-186, Jun. 1993, ACM Press.

Grunwald, et al., "CustoMalloc Efficient Synthesized Memory Allocators", Software Practice and Experience, vol. 23(8), pp. 851-869, Aug. 1993.

Hanson, D. R., "A portable Storage Management System for the Icon Programming Language", *Software Practice and Experience*, John C. Wiley & Sons, vol. 10(6):489-500, 1980.

Hastings, et al., "Purify: Fast Detection of Memory Leaks and Access Errors", In *Proceedings of the Winter 1992 USENIX Conference*, pp. 125-138, San Francisco, California, 1991.

Chilimbi, el al., Low-overhead Memory Leak Detection Using Adaptive Statistical Profiling", In *ASPLOS-XI: Proceedings of the 11th International Conference on Architectural Support for Programming Languages and Operating Systems*, pp. 156-164, New York, New York, 2004, *ACM Press*.

Hertz, et al., Quantifying the Performance of Garbage Collection vs. Explicit Memory Management, In *Proceedings of the Conference on Object-Oriented Programming Systems, Languages, and Applications*, San Diego, California, Oct. 2005.

Jim, et al., "Cyclone: A Safe Dialect of C", In *Proceedings of the General Track: 2002 USENIX Annual Technical Conference*, pp. 275-288, 2002, USENIX Association.

Lea, D, A Memory Allocator, http://gee.cs.oswego.edu/dl/html/malloc.html, pp. 1-8, website visited Mar. 22, 2006.

Necula, et al., "Ccured: Type-safe Retrofitting of Legacy Code", In *POPL '02: Proceedings of the 29th ACM SIGPLAN-SIGACT Symposium on Principles of Programming Languages*, pp. 128-139, 2002, *ACM Press*.

Nethercote, et al., "Bounds-checking Entire Programs Without Recompiling", In *SPACE 2003*, Jan. 2003, *ACM Press*.

PaX Team, PaX Address Space Layout Randomized (ASLR). Downloaded from http://pax.grsecurity.net/docs/aslr.txt, website visted Mar. 22, 2006, pp. 1-4.

Qin, et al., "Rx: Treating Bugs as Allergies: A Safe Method to Survive Software Failures", In *Proceedings of the Twentieth Symposium on Operating Systems Principles*, Oct. 2005, *ACM Press*.

Rinard, et al., Enhancing Server Availability and Security Through Failure-oblivious Computing, In *Sixth Symposium on Operating Systems Design and Implementation*, Dec. 2004, *USENIX*.

Rinard, et al., A Dynamic Technique for Eliminating Buffer Overflow Vulnerabilities (and Other Memory Errors), *Proceedings of the 20th Annual Computer Security Applications Conference (ACSAC '04)*, 9 pages.

Robertson, et al., "Run-time Detection of Heap-based Overflows", In *LISA '03: Proceedings of the 17th Large Installation Systems Administration Conference*, pp. 51-60, USENIX, 2003.

Shacham, et al., "On the Effectiveness of Address-space Randomization", In *CCS '04: Proceedings of the 11th ACM Conference on Computer and Communications Security*, pp. 298-307, 2004, *ACM Press*.

Xu, et al., An Efficient and Backwards-compatible Transformation to Ensure Memory Safety of C Programs, In *SIGSOFT '04/FSE-12: Proceedings of the 12th ACM SIGSOFT twelfth International Symposium on Foundations of Software Engineering*, pp. 117-126, 2004, *ACM Press*.

Yong, et al., "Protecting C Programs from Attacks Via Invalid Pointer Dereferences", In *ESEC/FSE-11: 11th ACM SIGSOFT International Symposium on Foundations of Software Engineering*, pp. 307-316, 2003, *ACM Press*.

Younan, et al., "Security of Memory Allocators for C and C++", Technical Report CW 419, Department of Computer Science, Belgium, Jul. 2005.

Zorn, B, "The Measured Cost of Conservative Garbage Collection", *Software Practice and Experience*, 23:733-756, 1993, John C. Wiley & Sons.

Microsoft Press Computer Dictionary, Third Edition, 1997, pp. 229-230.

* cited by examiner

SOFTWARE ROBUSTNESS THROUGH SEARCH FOR ROBUST RUNTIME IMPLEMENTATIONS

TECHNICAL FIELD

The technology relates to improving reliability of software programs. More particularly, the field relates to achieving improved robustness of software through search for robust runtime execution contexts.

BACKGROUND

Applications written in unsafe languages like C and C++ are vulnerable to many types of errors. In particular, these programs are vulnerable to memory management errors, such as buffer overflows, dangling pointers and reads of uninitialized data. Such errors can lead to program crashes, security vulnerabilities and unpredictable behavior. While many safe languages are now in wide use, a good number of installed software applications in use today are written in unsafe languages, such as C and C++. These languages allow programmers to maximize performance by providing greater control over such operations as memory allocation, but they are also error-prone.

Memory management errors at runtime are especially troublesome. Dynamic memory allocation is the allocation of memory storage for use in a computer program during the runtime of that program. It is a way of distributing ownership of limited memory resources among many pieces of data and code. A dynamically allocated object remains allocated until it is de-allocated explicitly, either by the programmer or by a garbage collector. In heap-based dynamic memory allocation, memory is allocated from a large pool of unused memory area called the heap. The size of the memory allocation can be determined at runtime, and the lifetime of the allocation is not dependent on the current procedure or stack frame. The region of allocated memory is accessed indirectly, usually via a reference.

The basic functions of heap memory management by a memory allocator in the C language, for instance, includes the function Malloc( ) for allocating an address on the heap to an object and the function Free( ) for freeing the object (in other words, de-allocating the memory on the heap associated with the object). There are some well-known runtime memory management errors, which can be categorized as follows:

Dangling pointers: If a live object is freed prematurely, the memory allocator may overwrite its contents on the heap with a new object or heap metadata.

Buffer overflows: Out-of-bound writes to heap can overwrite live objects on the heap thus, corrupting their contents.

Heap metadata overwrites: If heap metadata is stored too near heap objects, it can also be corrupted by buffer overflows.

Uninitialized reads: Reading values from newly-allocated memory leads to undefined behavior.

Invalid frees: Passing illegal addresses to Free( ) can corrupt the heap or lead to undefined behaviour.

Double frees: Repeated calls to Free ( ) of objects that have already been freed undermine the integrity of freelist-based allocators.

Many of the methods for improved software robustness generally seek to pinpoint the location of such errors in a program by extensive testing and then fixing the identified errors. The effectiveness of this paradigm, however, is subject to the effectiveness of the testing regime and requires changes to the code. Moreover, even extensively tested programs can fail in the field once they are deployed.

Thus, error tolerant executions of programs with memory management errors are desirable. Execution contexts that result in error tolerant executions can be identified based on the observation that a runtime system's scheme for allocating memory at runtime can vary significantly and, yet, maintain identical execution semantics with respect to a correct execution of the program. Thus, if there is an error in a program, some of these allocation schemes will result in incorrect execution of the program, while others do not. For instance, if there is a buffer overrun, then writing to the memory beyond the array may overwrite other important data. Some execution contexts are tolerant of such errors. For instance, if it so happens that the locations at the end of the array are not being used for other purposes by the program, no overwrites are caused. As a result, some error-tolerant execution contexts will allow programs with errors such as buffer overruns to execute correctly to completion despite the errors, while others do not.

Based on this observation, for a given program, it is desirable to improve software robustness by seeking an execution context in which, despite any errors, the program will terminate correctly.

SUMMARY

Described herein are systems and methods of improving the robustness of executions of software programs by masking at least some of the runtime memory safety errors. For instance, at least some memory safety errors are addressed by using a parameterized memory manager to execute software program instances according to an approximation of an infinite heap memory manager. In one aspect, infinite heap semantics are approximated by identifying and applying ideal configurations of parameters that are used to configure the parameterized memory manager to mask memory safety errors.

In another aspect, an ideal configuration of parameters that masks at least some memory safety errors approximates infinite heap semantics by padding at least some memory allocations on the heap with extra memory. This contributes to successfully avoiding at least some buffer overruns that could result in overwriting of important data on the heap. In another aspect, infinite heap semantics is approximated by deferring execution of calls to free memory allocated to an object. This in part contributes to reducing memory errors such as double frees and dangling pointers, for instance.

In a further aspect, ideal configurations of parameters can be identified by enumerating a set of parameters and applying the enumerated set of parameters to parameterized memory managers for conducting executions of instances of the software program. Results from such executions are then collected and at least one of the configurations resulting in a successful execution is selected as an ideal configuration. In one aspect, a successful execution is defined as one that has the same output as that resulting from an execution using a generously configured parameterized memory manager.

In a further aspect, ideal configurations are identified by iteratively searching a coordinate space of possible parameters until an acceptable configuration resulting in a successful execution of a software program is found. In another aspect, search for an ideal configuration for a parameterized memory manager that can mask at least some memory safety errors is identified based on data collected from copies of the software program deployed to customers. For instance, data related to success or failure of executions of the deployed software is correlated to the configurations they used to determine at least one configuration for a parameterized memory manager that masks memory safety errors in the software program.

In yet another aspect, configurations comprise parameters for configuring a randomized memory manager. For instance, the parameters may include one or more of an expansion factor by which to initialize a runtime heap as an approximation of an infinite heap, a number of replicas of a software program to be executed with randomized heap allocation and a random number seed for allocating in a random manner.

The foregoing and other objects, features, and advantages of the technology will become more apparent from the following detailed description, which proceeds with reference to the accompanying figures.

DETAILED DESCRIPTION

Figure 1:
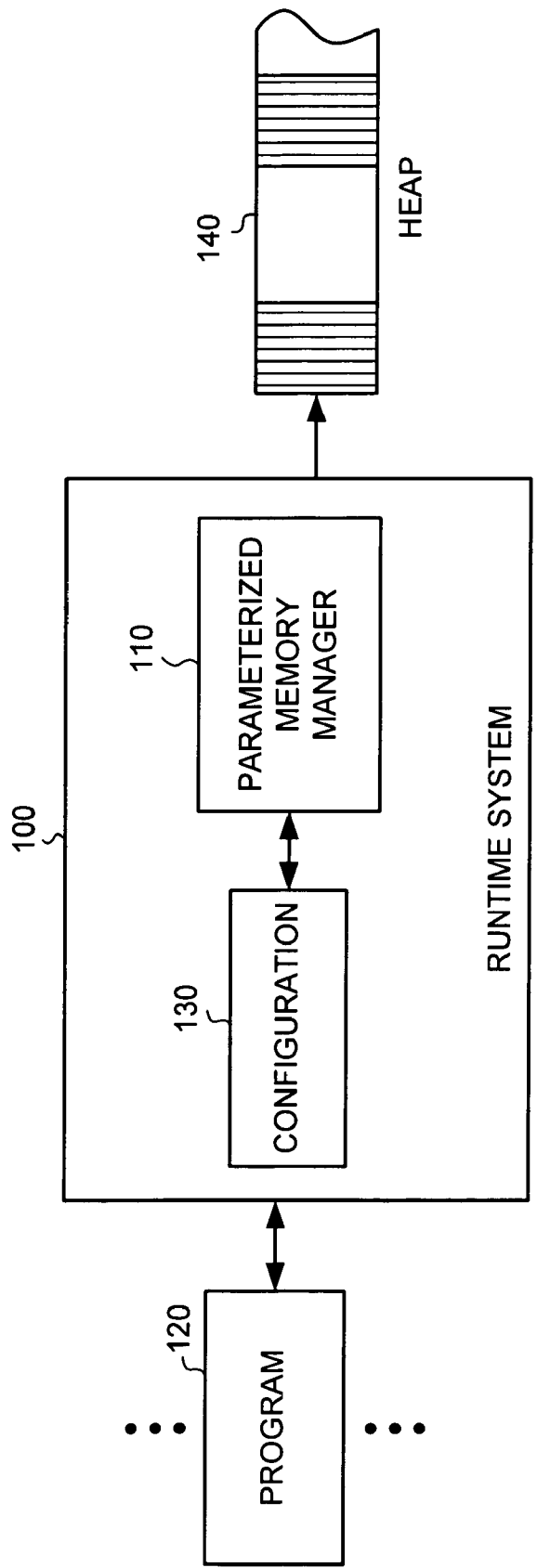
FIG. 1 is a block diagram illustrating an exemplary runtime system comprising a parameterized memory manager for managing a runtime heap.

One of the key components of a runtime system is a memory manager that, among other things, allocates and de-allocates memory on the heap to various objects of the program during its execution. Different memory allocation schemes can be implemented by a memory manager for the same program without a change in the semantic behavior of the program's execution. Thus, many equivalent execution contexts (e.g., memory allocation schemes) will result in a correct execution. This is because, objects allocated on the heap can be allocated at any address and the program should still execute correctly. However, some allocation schemes are more robust than others. For instance, some incorrect programs write past the end of an array. For such programs, the implementation of the memory allocator can have a significant effect on correct program execution. One implementation of the memory allocator may place an important object right next to the array, so that overwriting the array corrupts the data in the important object. Another implementation may place an empty space after the array, such that writing past the end of the array does not result in any program data being overwritten. Thus, this latter implementation can effectively hide the program error and allow the program to run correctly to completion.

Such buffer overruns are just one type of memory safety errors that break type-safety in programs written in weakly typed languages, such as C and C++. The other examples include duplicate frees (where an object that has been freed is given back to the memory allocator to be reallocated, but is accidentally freed again by the programmer) and dangling pointers (where addresses of objects exist, but the object pointing to that address has been de-allocated).

An ideal runtime system would address these memory safety errors by effectively masking them or accommodating them. One such exemplary ideal runtime environment would have the semantics of an infinite heap with the following exemplary properties:

All objects are allocated infinitely far from each other (conceptually, infinitely large) thus, overwriting the memory of one object can never corrupt the data of another object.

All heap memory is allocated only once and calls to Free ( ) are ignored.

All metadata used by the memory allocator is in a part of memory that cannot be written by the program.

All memory locations that are not allocated to objects are filled with random values.

While such an ideal runtime system is not practical, if in fact it can be realized, programs with memory safety errors would be more likely to complete correctly than they would with any conventional runtime system implementation. In much of the existing paradigm, programs that have any memory safety violations are considered to be incorrect a priori and, as a result, they are not concerned with understanding whether the complete execution of such programs results in a desired output. For the methods described herein, an ideal runtime execution is defined as a program executing to normal termination and generating output that is equivalent to that which would be produced by the program if it were run with the ideal runtime system.

In any event, one practical approach to providing robustness to memory safety errors equivalent to that provided by the ideal runtime system is by approximating the behavior of an ideal runtime environment with infinite heap semantics. However, not all approximations of an infinite heap are ideal. Some approximations may correctly mask the memory safety errors, but they could be expensive in terms of memory or processing time needed. Thus, it is desirable to identify approximations that, while they correctly mask the errors, are also efficient.

Approximating an Infinite Heap Memory Manager with a Parameterized Memory Manager and Search The descriptions herein outline various methods for identifying an efficient approximation of an infinite heap memory manager for a given application. Generally speaking, an approximation of an infinite heap memory manager has the same behavior as a true infinite heap memory manager but requires a memory space that is more comparable to a conventional memory manager. For instance, infinite heap semantics can be approximated by padding memory allocations with a designated amount of space beyond what is requested for the object in question. In one exemplary implementation, some selected number of bytes (e.g., 100 bytes) can be added to allocations. This method of padding is merely exemplary; other methods of specifying padding allocations are further described below. Regardless of the actual method of padding, any amount of padding beyond what is specifically requested in a memory allocation request (e.g., in a Malloc( ) call in the C language) reduces the occurrence of buffer overruns, which can result in overwrites that might affect allocated object data and any metadata.

Another exemplary approach to approximating infinite heap semantics relates to adding a delay between calls to free objects on the heap and the time when the locations affected are actually made available to other allocations. This, among other things, reduces the chances of an erroneous execution resulting from dangling pointers.

In one exemplary implementation of a memory manager, an infinite heap memory manager can be approximated by a parameterized memory manager so that aspects of an infinite heap memory manager, such as adding padding to the size of requested allocations and deferring the freeing of objects, are specified to the parameterized memory manager as parameters. As a result, the semantics of an infinite heap can be approximated in accordance with the specified parameters. This has the advantage of providing control over how the infinite heap semantics are actually implemented so that trade-offs between performance factors, such as memory, processing speed, and robustness, can be made in a controlled manner. For instance, FIG. 1 illustrates an exemplary runtime system 100 comprising a parameterized memory manager 110, which carries out memory management transactions related to the program 120 according to a configuration 130 of memory management parameters (e.g., padding, deferring frees, etc.). Thus, collection of parameters, such as padding (e.g., specified as specific number of bytes) and deferring of frees (e.g., specified as numbers of subsequent allocations to wait for before freeing a location) are specified as a configuration 130, which is then applied by the parameterized memory manager 110 for the execution of the program 120.

One method of improving robustness of software execution comprises searching for and identifying an ideal configuration (e.g., 130) that not only results in successful executions that mask some memory safety errors, but is also desirably efficient. In this manner, the robustness of an infinite heap memory manager is approximated by executing a given program with a parameterized memory manager (e.g., 110) operating according to a desirable configuration 130.

Exemplary Methods for Finding Ideal Configurations for a Parameterized Memory Manager The problem of searching for an ideal configuration (e.g., 130) can be illustrated with a simplified example. The following are exemplary runtime memory manager parameters that are combined to form various memory manager configurations:

Parameter 1—Indicating how many bytes are used to pad each object allocation (e.g., 0, 100, 1000)

Parameter 2—Indicating how many allocations to wait before actually freeing memory associated with an object that has been passed as a parameter to function call, such as Free ( ) (e.g., 0, 100, 1000)

The examples above lists two exemplary configuration parameters, thus, a particular configuration is defined as a pair. However, configurations need not be limited to a pair. Other configurations are possible and are described below in further detail.

Based on the definition of parameters above, a configuration of (100,100) indicates that the parameterized memory manager (e.g., 110) should pad memory allocated to each object with 100 extra bytes and defer frees for 100 allocations each time Free( ) is called. It should be noted that in this notation, a standard memory manager would be indicated by (0, 0) (since no padding occurs and there are no deferrals of free( ). An infinite heap memory manager, on the other hand, would be denoted by a configuration of ($\infty,\infty$). A practical and desirable configuration is somewhere between these two extremes.

Figure 2:
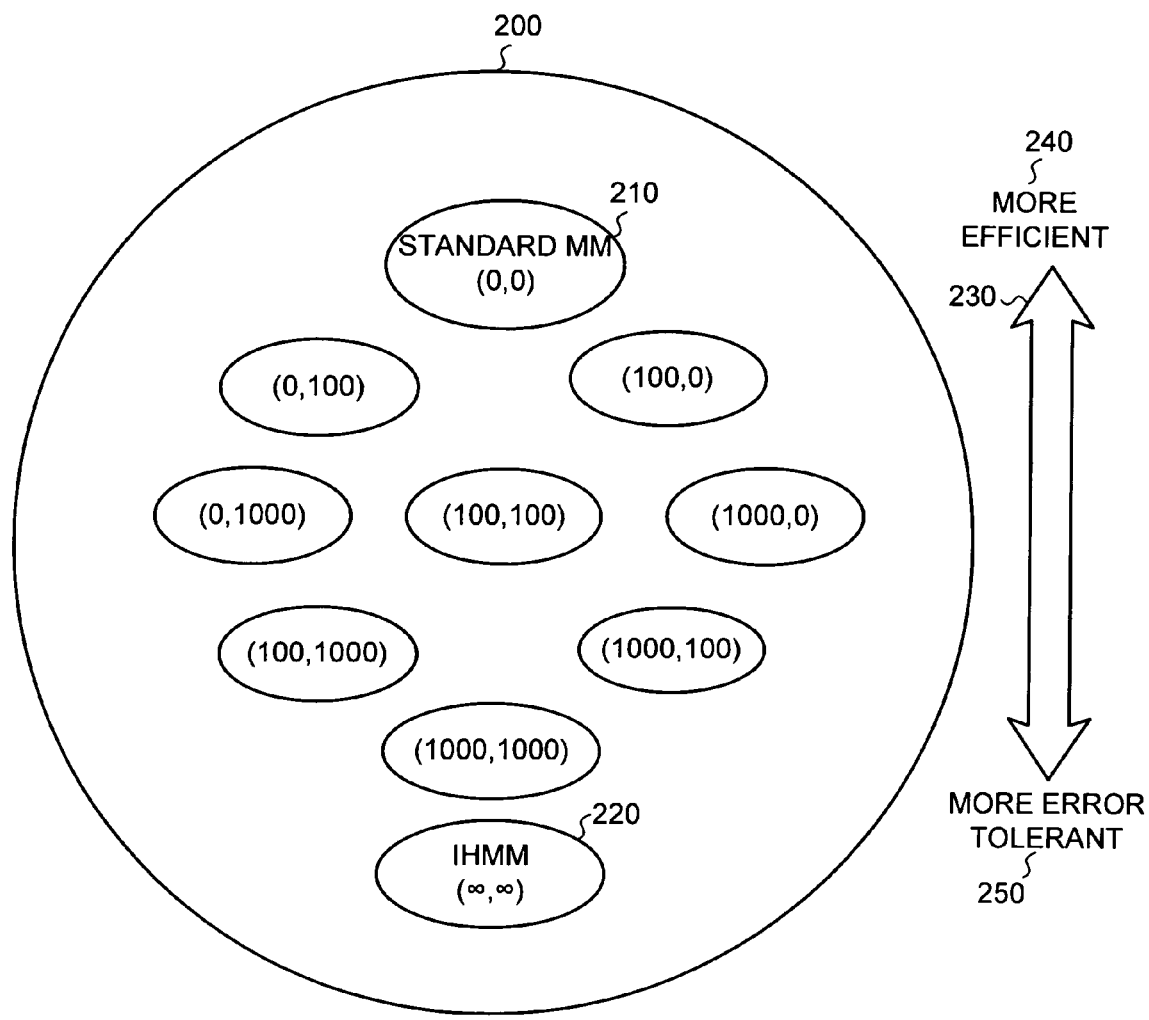
FIG. 2 is a block diagram illustrating an exemplary coordinate space of exemplary parameters to be used in defining the behavior of a parameterized memory manager.

FIG. 2 illustrates possible memory manager configurations in an exemplary coordinate space 200 with various configurations, including one of a standard memory manager ($\infty, \infty$) at 210 and that of an infinite heap memory manager ($\infty,\infty$) at 220. FIG. 2 also illustrates the trade-offs of each configuration at 230, with the more efficient, but less robust configurations, at the top 240 and the less efficient, but more error tolerant configurations at the bottom 250. Thus, in one overall approach to searching for an efficient configuration of a memory manager, the coordinate space 200 is populated with possible configurations and the most efficient memory manager configuration that masks errors in a given application is identified by systematically searching the coordinate space 200.

Figure 3:
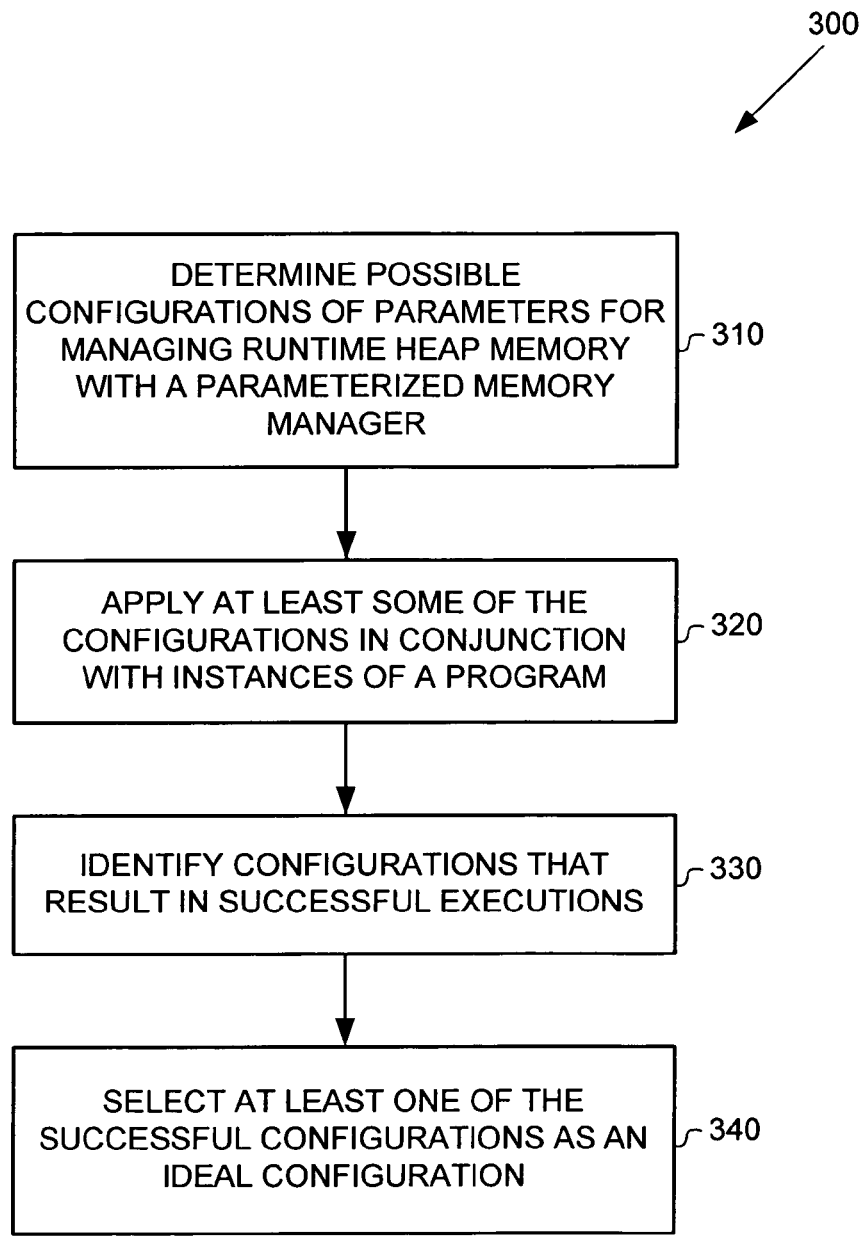
FIG. 3 is a flow diagram illustrating an exemplary method of searching for an ideal configuration from an enumerated set of configurations of parameters to be applied to a parameterized memory manager for masking at least some memory safety errors in software program.

FIG. 3 illustrates one such exemplary overall systematic search algorithm 300. At 310, possible configurations of parameters (e.g., 200 in FIG. 2) for a parameterized memory manager are identified. The possible configurations could be generated randomly. Alternatively, they can be enumerated based on restrictions related to implementation specific needs and used to populate the coordinate space 200 of FIG. 2, for instance. Then at 320, at least some selected configurations (e.g., 130 of FIG. 1) are applied to a parameterized memory manager (e.g., 110 of FIG. 1) in conjunction with the execution of a program instance (e.g., 120 of FIG. 1). Then, at 330, the configurations that result in successful executions are identified. Then at 340, one or more of the successful configurations are selected as an ideal configuration based on criteria, such as the extra memory allocation cost due to padding, for instance, and extra processing time costs related to deferred frees, for instance.

In one exemplary implementation, successful execution of a program, based on a particular configuration of a memory manager, is defined as complete execution of the program instance without an unwanted termination (e.g., a core dump). In many cases, however, programs with memory safety errors will not crash, but instead may produce incorrect results. To address this, in an alternative approach, successful execution is defined as follows with reference to the following exemplary memory safety error:

```
char* buffer = (char *) malloc(100); /* allocate a 100 byte buffer */
buffer[99] = 'x';                    /* typo - should have been 50 */
```

In the example above, the malloc(100) requested 100 bytes of memory on the heap (e.g., 140 in FIG. 1) for the exemplary object buffer ( ), but a later use at buffer[150] overwrites the allocated memory by 50 bytes.

An infinite heap memory manager which ideally tolerates all buffer overwrites, would mask the error above. Thus, one way to identify a successful execution is to compare the output to that of a program instance executed with an infinite heap memory manager. But, an infinite heap memory manager is not practical. Thus, instead, a very generous configuration, such as (1000, 1000) can be specified for a memory manager and outputs resulting from other configurations can be compared against the output from the generous configuration to evaluate their correctness.

Figure 4:
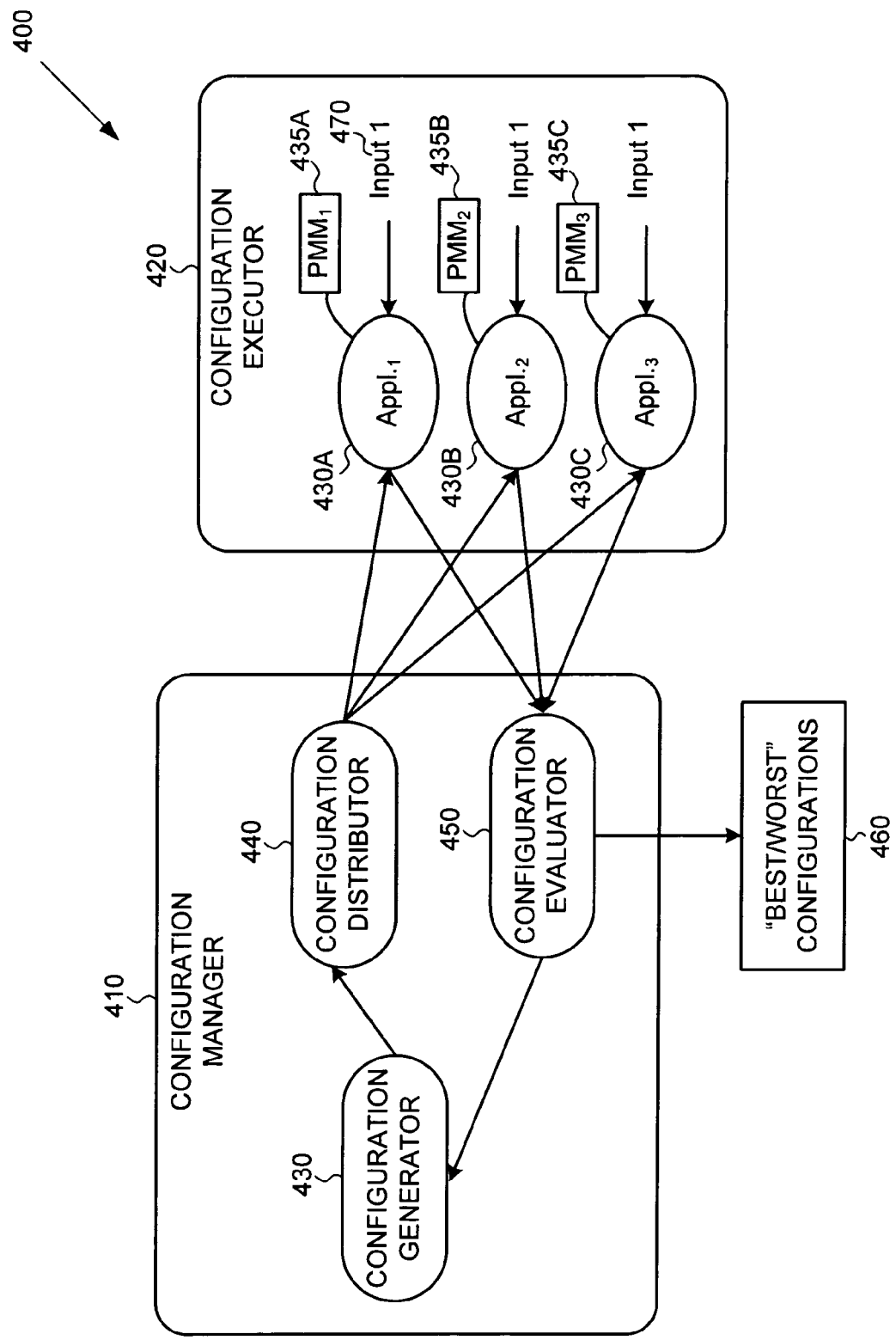
FIG. 4 is a block diagram illustrating an exemplary system for searching for an ideal configuration of parameters to be applied to a parameterized memory manager for masking at least some memory safety errors in software program.

An exemplary System of Finding Ideal Configurations for a Parameterized Memory Manager FIG. 4 illustrates an exemplary system 400 with an exemplary architecture for conducting a search of configurations in the coordinate space (e.g., 200 of FIG. 2) to identify an ideal configuration 130 of FIG. 1 for a parameterized memory manager (e.g., 110 of FIG. 1). The system 400 comprises a configuration manager 410, which is the component responsible for generating, distributing, and evaluating different configurations. The system also comprises a configuration executor component 420, which is responsible for executing instances of the program being evaluated (e.g., 430A-C), executing each with a differently configured memory manager (e.g., 435A-C) and reporting the results to the configuration manager 410. Based on the results reported by the configuration executor 420, the configuration manager 410 determines the most efficient configuration that results in a successful execution.

The exemplary system 400 has an exemplary architecture, wherein the configuration manager 410 itself comprises components, such as a configuration generator 430 for generating configurations to be evaluated, a configuration distributor 440 responsible for interacting with the configuration executor 420 to start instances of the program (e.g., 430A-C) and a configuration evaluator 450 to keep note of which configurations succeed or fail based on outputs reported by the configuration executor 420. Once the most efficient configuration is identified, the results are reported at 460 to a user. Later, when a program is executed (e.g., 120 of FIG. 1) with a parameterized memory manager (e.g., 110 of FIG. 1), the optimal configuration can be used to ensure at least some memory safety errors are masked. Such a solution provides both error robustness and memory efficiency. The architecture of FIG. 4 with the various components illustrated therein and their functionality is purely exemplary in nature and, as such, describes one such implementation. Other implementations are possible. For instance, functionalities can be redistributed between the various components of the system 400 or new components can be added without departing from the principles described herein.

An Exemplary Implementation of a Brute Force Search for an Ideal Configuration An exemplary functioning of the system 400 with its exemplary architecture is illustrated as follows in the context of the example configurations illustrated in FIG. 2. In this example, the configuration generator 430 generates the nine possible configurations shown in FIG. 2 and passes them to the configuration distributor 440. The configuration distributor 440 is responsible for interacting with the configuration executor 420 to start executions of instances of the program (e.g., 430A-C) each with a differently configured memory manager (e.g., 435A-C). Thus, nine instances are executed and the results of their execution are compared to the results of a generous configuration, such as (1000, 1000). These results (e.g., success/failure) are passed back to the configuration evaluator 450. For the exemplary memory safety error above, the buffer overrun was 50 bytes past the end of the array. In this case, among the nine configurations listed in FIG. 2, the following configurations will succeed:

(1000, 1000), (1000, 100), (1000, 0), (100, 1000), (100, 100) and (100, 0) The following configurations will fail:

(0, 0), (0, 100), (0, 1000)

Based on this information, the configuration evaluator 450 can then select at least one ideal configuration from among the successful configurations for reporting at 460. The criteria for selecting the ideal configurations can vary depending on various needs. If, for instance, the criteria calls for a successful configuration that uses the least amount of memory, the ideal configuration in this example will be (100, 0).

In this exemplary implementation 400, each time a program instance (e.g., 430A-C) is executed, the same input (e.g., input 1 at 470) is provided, so that the results of each execution can be accurately compared with that of a generous configuration, such as (1000, 1000), which is also executed with the same input (e.g., input 1 at 470). While this is possible in a test environment, it is very difficult and impractical to achieve for deployed programs. Furthermore, according to this approach, all configurations to be tested (e.g., as those nine shown in FIG. 2) are enumerated first and then evaluated further for suitability. While this is practical for a small number of parameters and a small bounded coordinate space with a limited number of possibilities, it becomes increasingly impractical as the number of parameters increase and the boundaries around the values they can hold widen.

Exemplary Iterative Search Approaches

Figure 5:
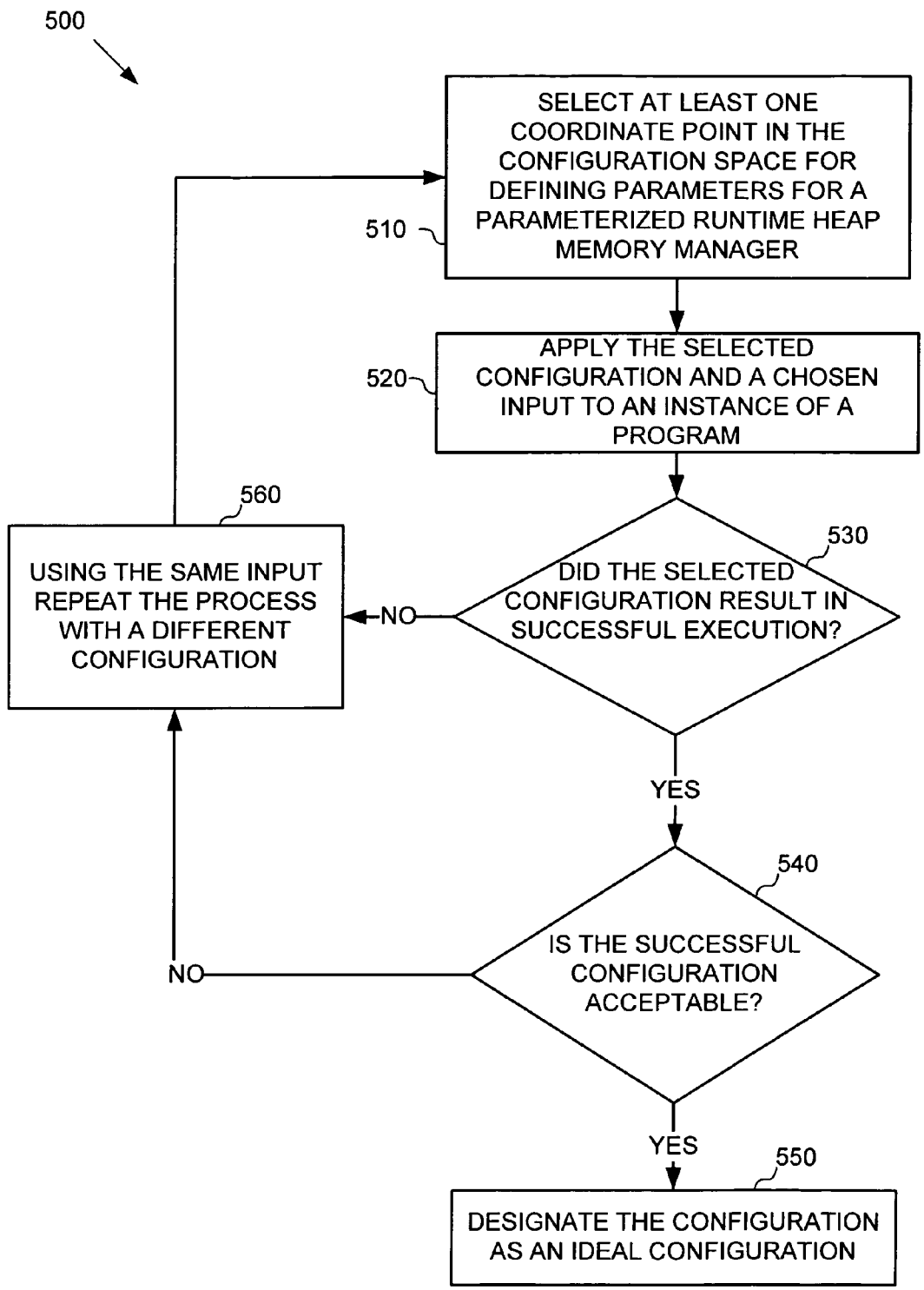
FIG. 5 is a flow diagram illustrating an exemplary method for iteratively searching a configuration coordinate space of parameters for identifying at least one ideal configuration to be applied to a parameterized memory manager for masking at least some memory safety errors in software program.

Another exemplary method of finding an ideal successful configuration is to generate configurations and evaluate them iteratively. For instance, instead of evaluating all possible configurations at once, the configuration generator 430 can iteratively generate configurations and evaluate each to see if it results in a successful execution and whether it is suitable. The iterations can then probe the coordinate space in a systematic search. FIG. 5 illustrates such an exemplary iterative search method 500. At 510, one configuration in the configuration coordinate space (e.g., 200 of FIG. 2) is first selected for evaluation and at 520 the selected configuration is applied for the execution of a program instance (e.g., 430 A-C). At 530, it is determined whether the execution is a successful execution. In one implementation, successful execution is one that results in the same output as that of a generous configuration, such as (1000, 1000). If the execution is successful, the configuration evaluator, for instance, can then (at 540) determine if the known successful configuration is efficient enough. If it is, at 550 it designates that configuration as the ideal configuration and the process ends.

On the other hand, if either the current configuration fails at 530 or if the configuration is not efficient enough at 540, the search process continues at 560 with a different configuration. For example, if the search is a breadth-first search of the set of possible exemplary configurations 200 of FIG. 2, starting with the most efficient configuration (0, 0) the search may proceed to generate (0, 100), and (100, 0) as the next configurations to evaluate. In case of the exemplary memory error of a 50 byte buffer overwrite, the configuration (100, 0) will succeed and (0, 100) will fail. These results are passed back to the configuration evaluator 450 of FIG. 4, which will output (100, 0) as the best possible configuration, since other more efficient configurations, just (0, 0) in this case, have already been evaluated and found to have failed.

In an alternate iterative search approach, the configuration generator 430 starts with the configurations that are more likely to succeed (e.g., (1000,1000)), but are less efficient, and attempts to generate more efficient configurations that also succeed. Thus, configurations to be evaluated can be generated in a variety of ways, including based on a bread-first search, depth-first search, hill-climbing, randomly picking, or using genetic algorithms, if the configuration space is large, for instance. The problem of finding an optimal or near-optimal successful configuration in a large space of possible configurations is completely analogous to other search problems, such as searching for winning board configurations in computer chess and searching for the optimal solutions to exponential problems. Any of these techniques might be effectively used in an implementation of this approach.

Exemplary Methods of Searching for Efficient Configurations with Deployed Program Instances The previous discussions on finding efficient configurations assumed that program instances (e.g., 430 A-C in FIG. 4) were executed with same input (e.g., 460) for appropriately evaluating the results. While this is possible in a test environment, when programs are deployed in the field it is more difficult to control what inputs are used for an execution (e.g., in interactive applications). Another issue in this case is the question of how one defines success and failure of an execution. In a test environment, it is practical to execute an inefficient configuration (e.g., (1000, 1000)) to determine a correct output associated with a successful execution that masks memory errors. In case of deployed applications, however, it is undesirable to execute such inefficient configurations to determine the correct output. Instead, much coarser measures need to be used. For example, failure can be defined as crashing or terminating abnormally, whereas success can be defined as terminating normally.

Figure 6:
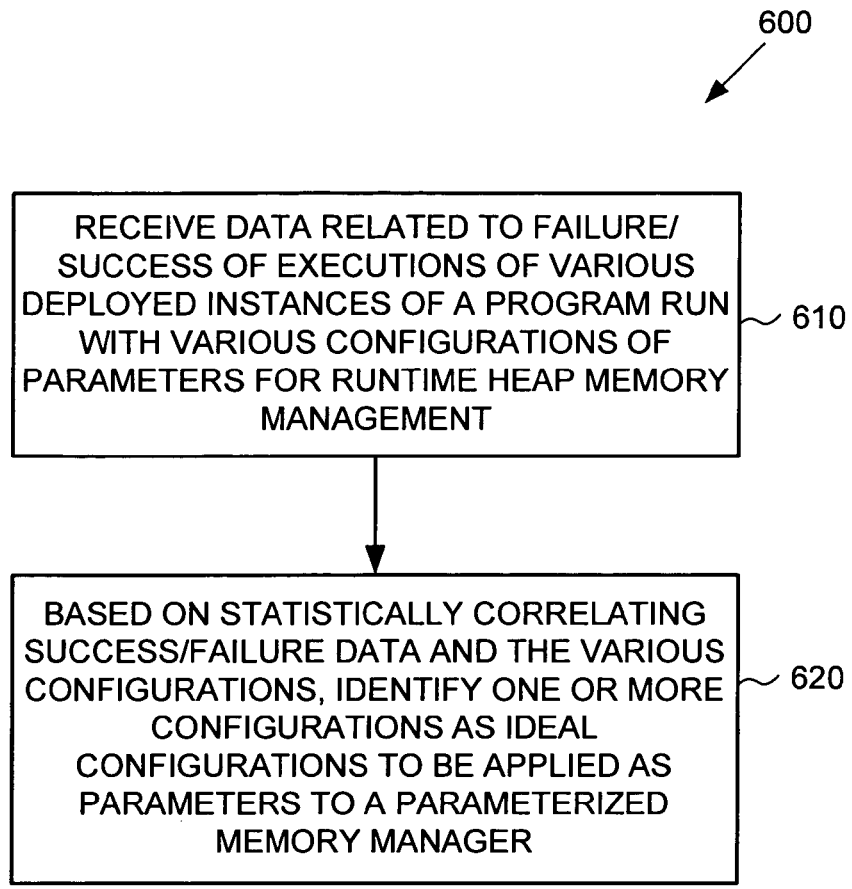
FIG. 6 is a flow diagram illustrating an exemplary method of searching for ideal configuration to be applied to a parameterized memory manager based on statistical correlation of results collected from executions of deployed copies of the software program.

Thus, in one exemplary method 600 of FIG. 6, success/failure data associated with executions of various instances of deployed software programs executing in conjunction differently configured memory managers are received, at 610. Then at 620, an ideal configuration can be chosen based on statistical correlation observed between the success/failure data and the various configurations used in the executions of the various instances of deployed programs. Once identified, the most robust configurations can be replicated for execution of the deployed program's copies. In this approach, the configuration executors (e.g., 420 in FIG. 4) are desirably implemented on customer machines running the deployed instances of the program being evaluated.

In one exemplary implementation, multiple replicas of the deployed programs are simultaneously executed, each replica running with a different configuration. Since these replicas are likely to be running on a customer's hardware, only a small number of replicas can be accommodated due to practicality. Depending on the number of replications used, a small number of known configurations are compared directly with each other given the same exact input. For instance, some exemplary results sent back to the configuration evaluator (e.g., 450 of FIG. 4) may be as follows:

Application Input1, config 1—Succeed
Application Input1, config 2—Fail
Application Input1, config 3—Succeed
Application Input2, config 2—Fail
Application Input2, config 3—Succeed
Application Input2, config 4—Fail
Application Input3, config 1—Fail
Application Input3, config 3—Succeed
Application Input3, config 4—Succeed In this case, the configuration evaluator (e.g., 450 of FIG. 4) finds statistically significant correlations between success/failure data and the various configurations. For example, in the results above, the configuration "config 3" succeeds in all the listed inputs (input 1, input 2, and input 3), whereas configurations "config 1" and "config 4" only succeed for just one of the inputs. Thus, based on this exemplary data, a configuration evaluator (e.g., 450 of FIG. 4) concludes that "config 3" is the most robust configuration. This configuration can then be specified in each of the deployed copies of the application program to be used to configure their respective parameterized memory manager (100 of FIG. 1 to improve the robustness of their executions.

The probability that a given configuration is robust is dependent on the number of different inputs it has been executed with and the number of times it is observed to succeed or fail. To improve the dependability of such statistical inferences, a configuration generator (e.g., 430 of FIG. 4) may be programmed to generate more instances of a known configuration to increase the number of times a particular configuration will be executed.

Figure 7:
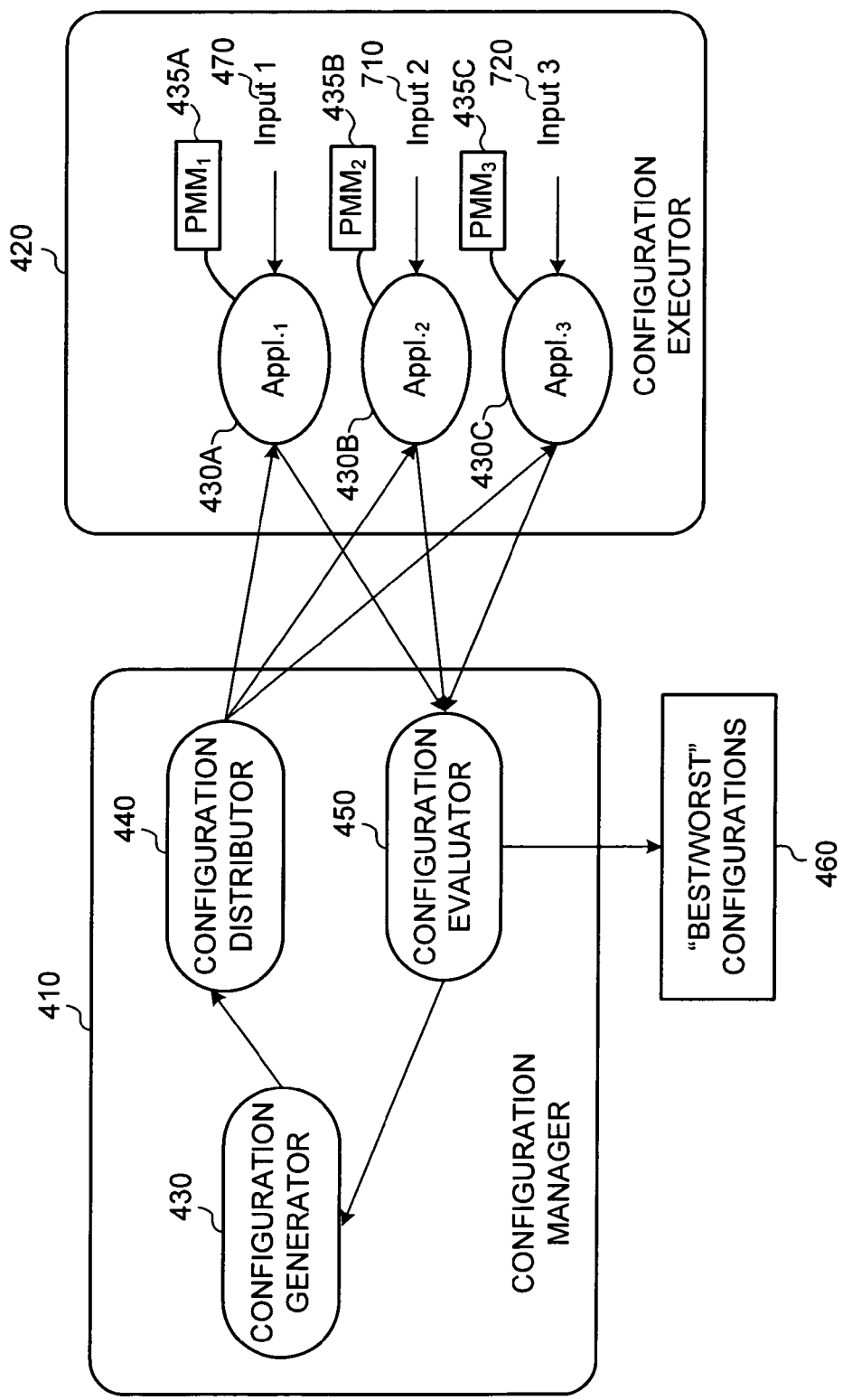
FIG. 7 is a block diagram illustrating an exemplary system for identifying an ideal configuration to be applied to a parameterized memory manager based on statistically correlating results of executions of deployed copies of the software program.

Replication of program instances allows the same input to be tested on several program instances running with different memory manager configurations. But, replication can be costly due to additional hardware requirements. In another approach to determining an ideal configuration based on statistical inferences, program instances deployed in the field running with different memory manager configurations and with different inputs are used. FIG. 7 illustrates the program instances 430A-C running with different inputs (e.g., 470, 710 and 720). In this exemplary implementation, the results generated may be as follows:

Application Input1, config1—Succeed
Application Input2, config3—Succeed
Application Input3, config 2—Fail
Application Input4, config 3—Succeed
Application Input5, config 4—Fail
Application Input6, config 1—Fail
Application Input7, config 3—Succeed Application Input8, config 4—Succeed As before, the configuration evaluator 450 finds a correlation between a particular configuration and success/failure data. For the exemplary results data above, the correlation data is computed as the success rate of a particular configuration across different program instances, which is as follows:

Config 1—50% success
Config 2: 0% success
Config 3: 100% success
Config 4: 50% success For the data above, the configuration "config 3" will emerge as the most successful configuration. This configuration is then desirably replicated on all the deployed program copies to improve their robustness by masking memory errors.

Exemplary Methods of Randomized Allocation on an Exemplary Approximation of an Infinite Heap A memory manager having access to a truly infinite heap is impractical. However, an approximation of an infinite heap memory manager, with one or more of the characteristics described above can be made practical. For instance, in one exemplary implementation, the address space of an approximated infinite heap is defined to be an exemplary expansion factor M times the total amount of address space required by the program assuming it has perfect packing. Intuitively, the larger the expansion factor (e.g., M), the more unallocated space exists between allocated objects and, thus, the less likely that a buffer overwrite of one object by another will occur. As a result, a larger value for the expansion factor increases the probability that a particular random execution will generate results that agree with results of an execution in an ideal runtime environment. Of course, a larger value for the exemplary expansion factor also increases the memory requirements of running the program. However, users can analytically reason about the trade-offs between increased robustness versus increased demand for memory use.

Figure 8:
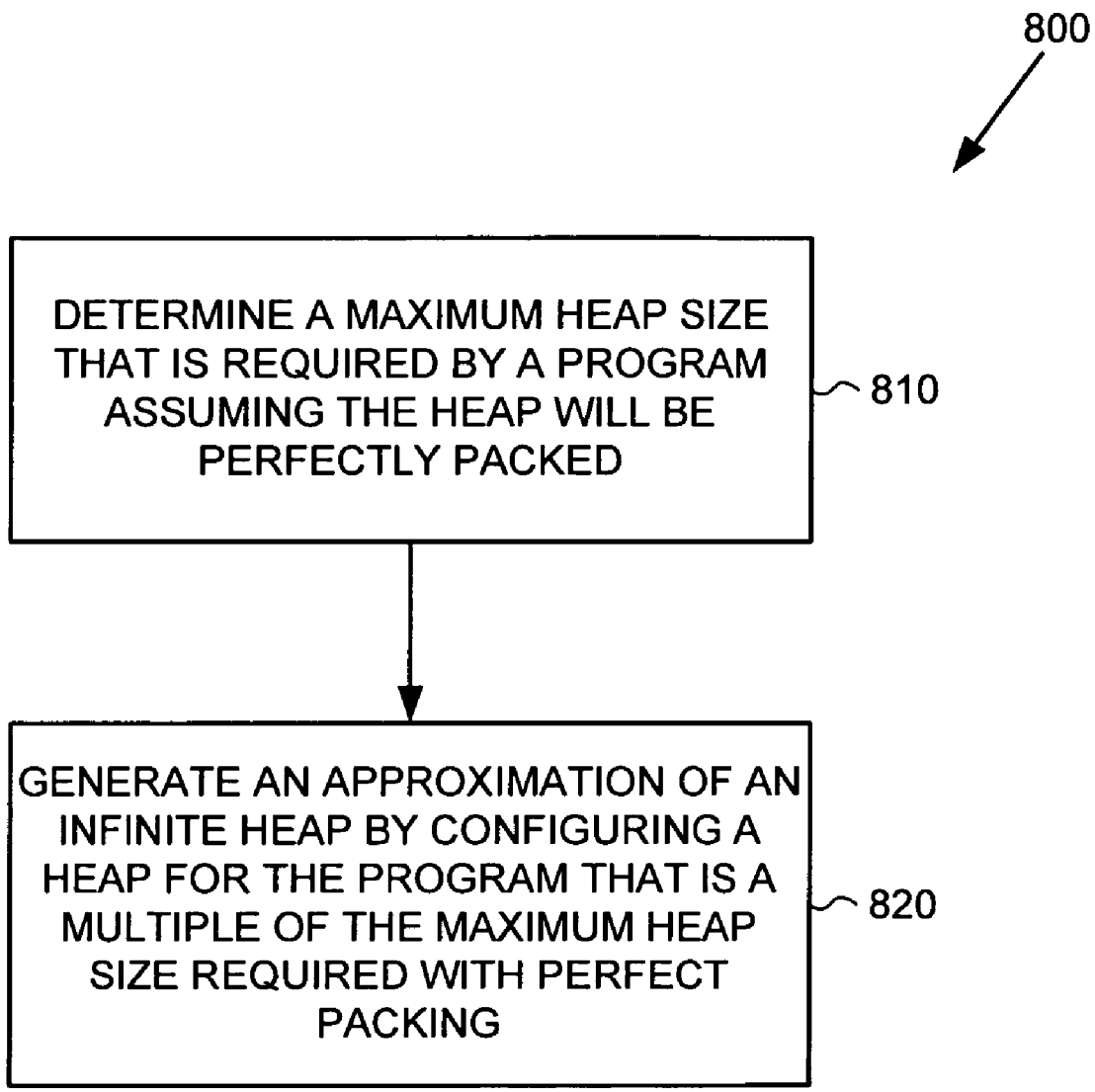
FIG. 8 is a flow diagram illustrating an exemplary method for generating an approximation of an infinite heap.

FIG. 8 further illustrates this method 800 of generating an approximated infinite heap. At 810, a maximum heap size required by a program assuming that the heap will be perfectly packed is first determined. Then at 820, an approximation of an infinite heap is determined which is a multiple (e.g., by an expansion factor M) of the maximum heap size required by a program assuming perfect packing. The expansion factor M can be any positive number, including an integer or even a real number with a fraction. In one embodiment, the expansion factor M is a parameter for a call to a parameterized memory manager (e.g., 110 of FIG. 1) that implements the behavior of an approximated infinite heap memory manager.

Figures 9A, 9B:
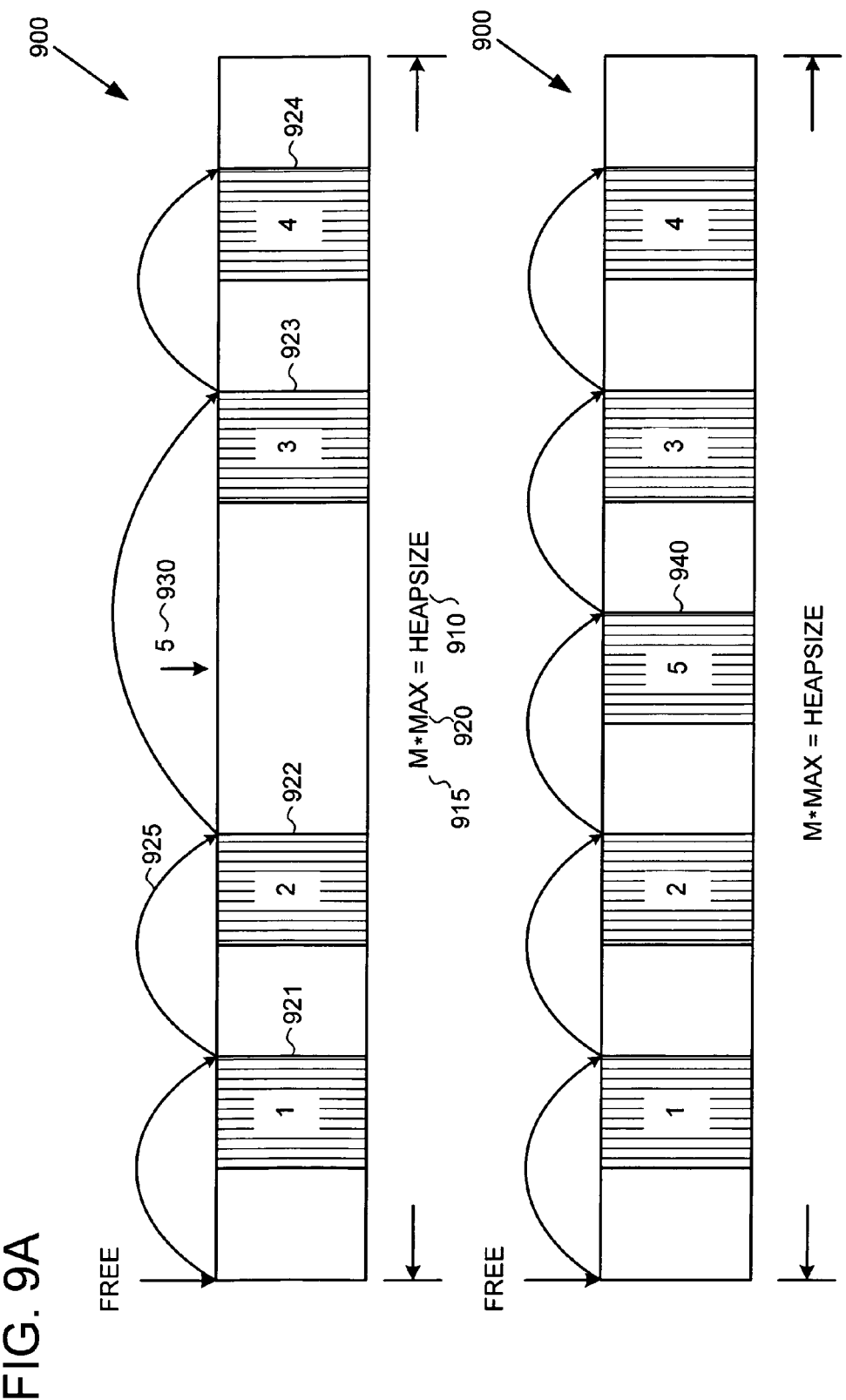
FIG. 9A is a block diagram illustrating an exemplary approximation of an infinite heap with an exemplary request being presented for allocation.
FIG. 9B is a block diagram illustrating the exemplary approximation of the infinite heap of FIG. 9A with the requested allocation having been processed by randomized allocation of the object on the heap.

FIG. 9A illustrates one such approximation 900 of an infinite heap. The heap size 910 of this approximation 900 is a variable expansion factor M, at 915, times the total heap size (e.g., Max at 920) required by the program assuming perfect packing. Data regarding memory locations (e.g., 921-924) already allocated to objects is maintained. A free list data structure, as shown at 925, comprising a list of pointers to addresses of locations on the heap 900 that are free is also maintained. Thus, in one probability analysis, the chance of randomly allocating a new object to a memory location that interferes with a previous allocation is less than or equal to 1/M, which assumes that all objects that need to be allocated have in fact been allocated.

Figure 10:
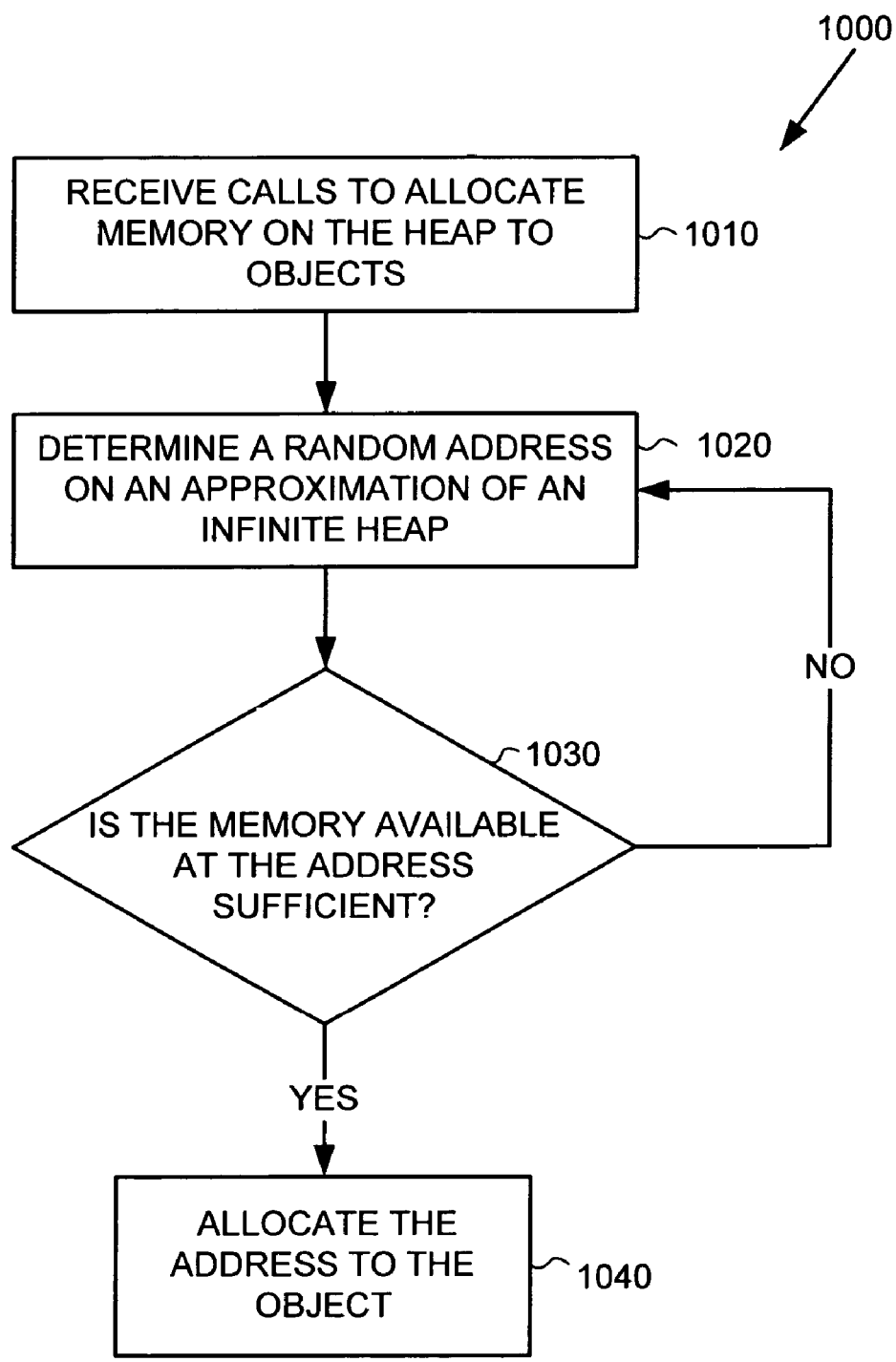
FIG. 10 is a flow diagram illustrating an exemplary method for randomized allocation of memory on an approximated infinite heap.

The memory manager for allocating and de-allocating objects on an approximated infinite heap, such as the one at 900, is randomized in order to improve the chances of hiding memory safety errors. FIG. 10 illustrates one approach 1000 to randomized allocation. Upon receiving calls at 1010 to allocate memory on the heap to an object, at 1020, a random address associated with the approximated infinite heap (e.g., 900) is determined. The determination of the random address can be based on a random number seed used to generate a sequence of random numbers. Many types of random number generators are suitable. For instance, Marsaglia's multiply-with-carry random number generation algorithm is one such suitable random number generator. Once the random address is generated, at 1030, if the memory space associated with the address is sufficient, at 1040 that space is allocated to the object in question. If not, the process returns to 1020 to probe the heap again to find another random address on the free list. In one exemplary implementation, the free list is structured in such a way that the elements of the list are sorted in address order. This allows allocations to avoid searching the entire list. FIGS. 9A-B illustrate the random allocation of an object 5 of FIG. 9A (930) at an appropriate memory address shown at 940 on the approximated infinite heap 900 as shown at FIG. 9B.

The method 1000 of FIG. 10 is exemplary. Other variations are possible to randomize the allocation of heap memory. For instance, in one alternative, once a random address is first identified (e.g., as in 1020 in FIG. 10), the free list is searched for the first available free list element with an address greater than the random address. If that address is not suitable, instead of generating another random address for allocation, the next available address location greater the first randomly generated address is examined for suitability. In this embodiment, the costs associated with repeatedly generating random numbers can be avoided but it is also less random.

Figure 11:
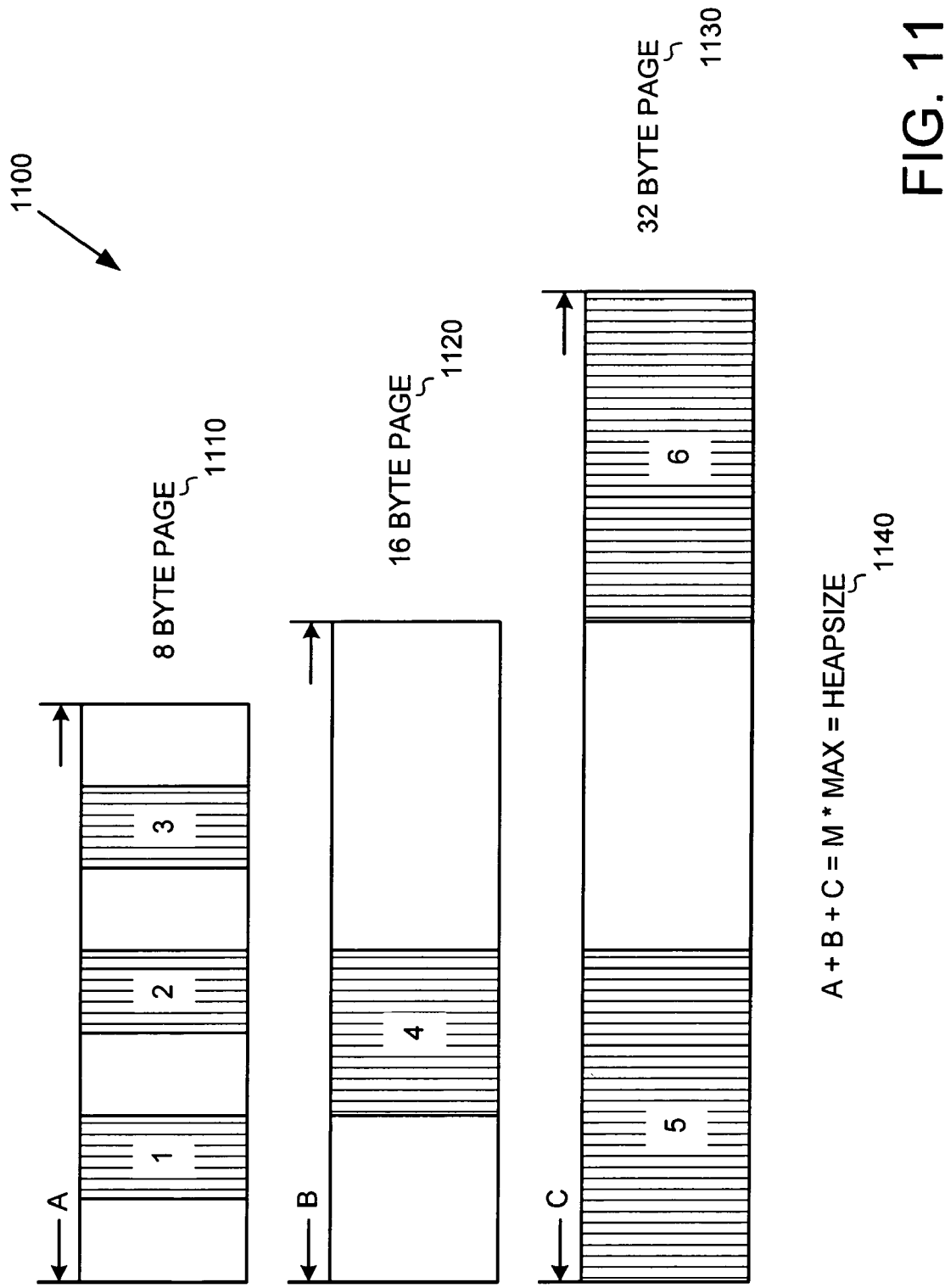
FIG. 11 is a block diagram of an exemplary approximation of an infinite heap comprising exemplary subdivisions of object size specific pages.

A further alternative implementation illustrated with reference to FIG. 11 has the approximated infinite heap 1100 subdivided into classes of different sized objects (e.g., size 8 bytes, 16 bytes, 32 bytes, etc.). Each size class would be allocated contiguously in a set of pages (e.g., 1110, 1120, and 1130). To allocate an object, the size requested is first mapped to a size class (e.g., one of 8 bytes, 16 bytes, 32 bytes, etc.) and a uniform random number is generated from 0 to the current number of elements allocated to the size class (minus one). The number is mapped to a specific location on a specific page (e.g., one of the sets 1110, 1120, and 1130) and the first free location after that location is used for the allocation. An auxiliary bitmap per size class is updated to indicate the location has been allocated. The total size of the heap 1140 remains a multiple M of the heap size required assuming perfect packing. Such classification based on size of requests and allocating to different regions of memory that are size specific makes the algorithm more practical by reducing the fragmentation that is likely to result if small objects are scattered across the entire heap.

A key aspect of both strategies is the ability to characterize the configuration of a randomized heap manager concisely. Thus, it is advantageous to be able to control the runtime system configuration purely through specifying a collection of parameters so that no recompilation and/or relinking are necessary to run an application with a different configuration.

When an object is allocated in a randomized runtime, the goal is to distribute the addresses of the allocations across the address space as uniformly as possible with high efficiency. While two possible methods are illustrated in detail, there are many ways to accomplish the same. For instance, either approach above could be written such that, if the random address generated already contains an object, then another random address is generated, continuing until an empty location is identified.

Figure 12:
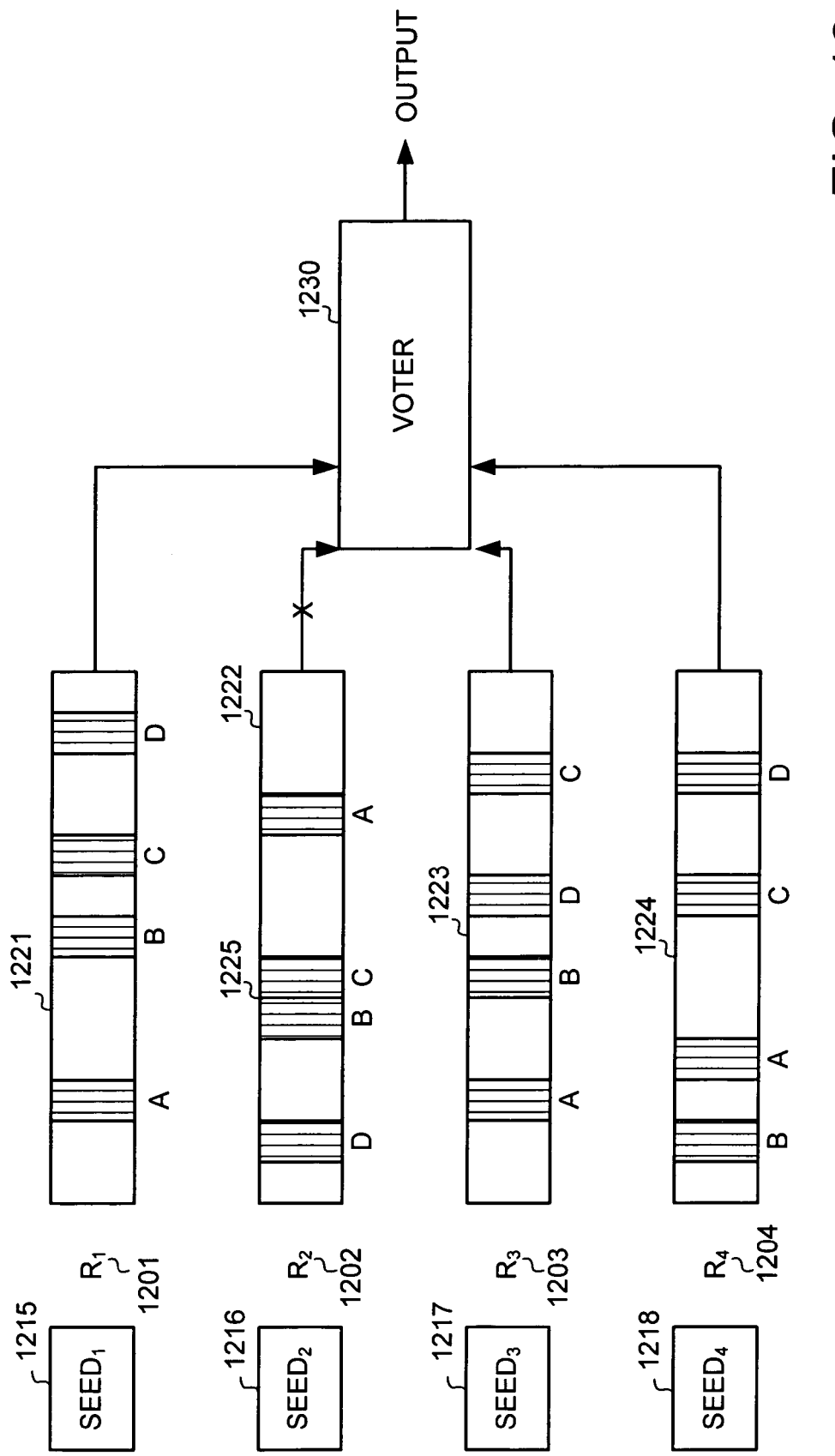
FIG. 12 is a block diagram illustrating an exemplary runtime system comprising exemplary replicas of a software program, each replica having associated therewith an exemplary randomized infinite heap approximation for conducting a robust execution of the program.

Exemplary Randomized Heap Memory Managers for Managing Randomly Replicated Executions of a Program By choosing to execute a plurality (e.g., some value N) of replicas of a program with execution contexts that are randomly different, it is more likely that an execution context that masks errors can be identified and used. The execution context as it relates to dynamic allocation of memory on an approximation of an infinite heap can be randomized as described above (e.g., with reference to FIGS. 10 and 11). As shown in FIG. 12, a plurality of replicas $R_1$-$R_4$ (1201-1204) of a program are executed each with randomized heap memory management and each are randomized according to a different seed (e.g., $Seed_1$-$Seed_4$ 1215-1218) for allocating and deallocating memory on an approximated infinite heap (e.g., 1221-1224). By randomizing the memory management with different seeds (e.g., 1215-1218), the different heaps (e.g., 1221-1224) associated with each of the replicas $R_1$-$R_4$ (e.g., 1201-1204) will likely look different as the program execution proceeds. For instance, as shown in FIG. 12, the allocation of exemplary objects A-D is randomly different on the different heaps 1221-1224. The allocation scheme on the heap at 1222 associated with the replica $R_2$ at 1202 shows an allocation of objects B and C at 1225 that is potentially vulnerable to buffer overruns and heap meta-data overwrites. Thus, it is possible that at least one of the replicas $R_1$-$R_4$ (1201-1204) is likely to be corrupted.

The corrupted replica can be determined by comparing the outputs of the various replicas $R_1$-$R_4$ (1201-1204) at the voter 1230. For instance, when the output of one replica (e.g., $R_2$ at 1202) disagrees with the rest, that replica is more likely to be corrupted than not, therefore, it is discarded while the execution of the rest is continued. Thus, when one or more replicas have outputs that agree, the confidence that one has that the results of these executions agree with the results generated in an ideal runtime environment can be determined analytically and controlled by choosing the number of replicas N, for instance. Generally, the greater the number of replicas, the greater the chance that one of them is executing in an ideal runtime environment. Furthermore, the greater the number of replicas whose outputs agree, the greater the chances that they are executing correctly.

However, choosing a high number of replicas also has drawbacks. For instance, running a number of replicas, particularly simultaneously, adds to the cost of computing by putting a greater burden on the processor. Therefore, it would be better in some cases to implement the execution of the replicas on a system with multiple processors to reduce the negative impact on processing speeds. Another factor that affects the probability of identifying an execution context that is ideal is the expansion factor M associated with generating infinite heap approximation (e.g., 420 of FIG. 4). Thus, by explicitly choosing N, the number of replicas, and M, the expansion factor for realizing an approximated infinite memory, a runtime system designer can trade memory and central processing unit usage against improved robustness of a program execution.

In one exemplary implementation, a programmer could explicitly choose the number of replicas N and the expansion factor M, and pass it on as parameters to a runtime system. In another implementation, the runtime system could choose the number of replicas N and/or the expansion factor M based on previously measured executions of the program and recorded outcomes. In another implementation, a standard value of N and M (e.g., N=3, M=2) could be used in all cases. In one exemplary implementation, the expansion factor M associated with each of the replicas for approximating their associated infinite heap need not be the same.

Figure 13:
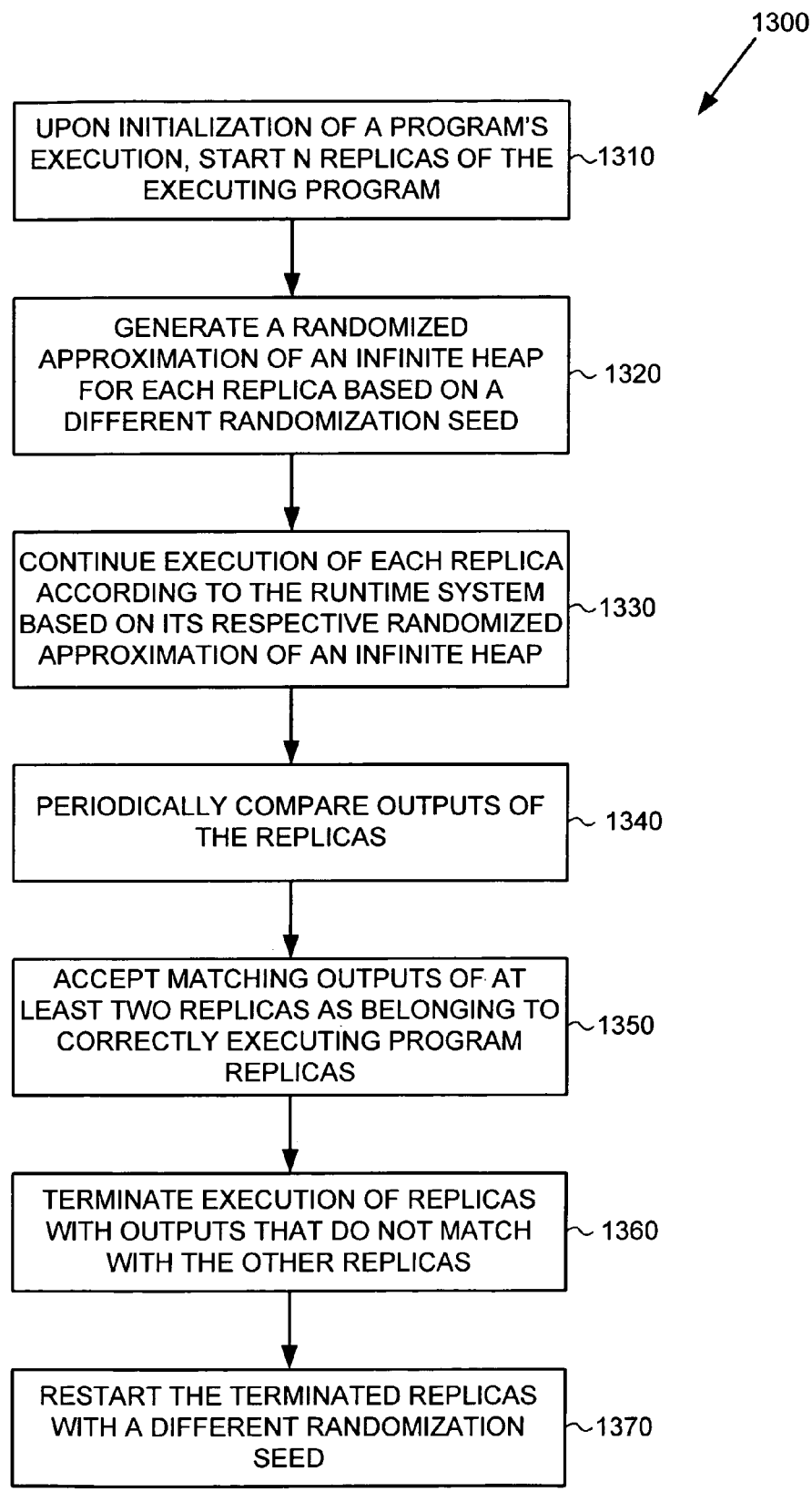
FIG. 13 is a flow diagram illustrating an exemplary method of conducting a robust execution of a software program comprising execution of exemplary replicas of a software program, each replica having associated therewith an exemplary randomized infinite heap approximation.

Exemplary Methods of Randomized Heap Memory Managers for Managing Randomly Replicated Executions of a Program FIG. 13 illustrates an exemplary method 1300 of randomized heap memory management of a plurality of replicas of a program in a runtime system. Upon initiation of executing a program, at 1310, N different replicas of the executing program are started. At 1320, a randomized approximation of an infinite heap is generated for each of the replicas based on a different randomization seed. At 1330, the execution of each of the replicas is continued in the execution context of their respective randomized approximations of an infinite heap. At 1340, output of the various replicas is periodically compared, during I/O operations, for instance. The output streams of the different replicas (e.g., $R_1$-$R_4$ at 1201-1204 in FIG. 12) are connected to the checking process (e.g., Voter at 1230), such that when output from the replicas are about to be flushed to a disk, the voter 1230 can intercept the action and process the output before proceeding. Then at 1350, outputs of those replicas that agree are retained as correct and flushed to a disk, for instance, whereas the replicas whose outputs do not agree with any of the other replicas are terminated or repaired at 1360.

The Voter 1230 of FIG. 12 chooses an output agreed upon by at least two of the replicas (e.g., $R_1$-$R_4$ at 1201-1204 in FIG. 12) and outputs that result. Two replicas suffice, because the odds are slim that two randomized replicas with memory errors would return the same results. On the other hand, any non-agreeing replicas are more likely to have errors, and thus, are terminated. Optionally, at 1370, these replicas may be restarted with a different seed. If no replicas agree, then all are terminated. In one exemplary implementation, the matching of outputs can be computed efficiently by calculating a secure hash of the value of each page (or multiple pages) and comparing the hash. There are disadvantages to this periodic synchronization of outputs. One such disadvantage is that an erroneous replica could theoretically enter an infinite loop, which would cause the entire program to hang, because the synchronization would never occur. There are two exemplary approaches to resolve this situation. For instance, a timer can be used to terminate replicas that take too long to arrive at the barrier (e.g., voter 1230 of FIG. 12), or ignore the problem. Establishing an appropriate waiting time would solve the problem of consensus in the presence of Byzantine failures, which is undecidable.

Having several replicas running with errors in deployed applications can be addressed as well. Randomizing execution contexts by generating randomized infinite heaps improves the chances that at least some of the replicas are executing in an ideal runtime environment. As noted above, the drawback to this approach is the cost of running multiple replicas. Therefore, in one implementation, the randomized replicas could be run during a testing phase and when an ideal runtime environment is identified, the variables, such as the expansion factor M, associated with successful execution and the outputs of the successful execution can be used by memory managers associated with the deployed applications. Even here, the successful execution is still probabilistic. In one exemplary implementation of this approach, the application would be run in phases. In phase one, the application would be run over a suite of test inputs with a large heap expansion factor M and two replicas, for instance, so that the likelihood of an ideal runtime environment execution is high. This process is repeated until the outputs of the two replicas agree. The outputs of the two replicas would be compared as above. The resulting output is highly likely to be the same as the ideal runtime environment output (and this likelihood can be determined analytically). This output is stored for use in phase two.

In phase two, smaller values of the expansion factor M could be used and the resulting output can be compared against the output of the ideal runtime environment obtained in phase one. Generating multiple random instances for a given value of the expansion factor and comparing the results against the ideal runtime environment output allows us to determine the probability of an ideal runtime environment execution for a given value of the expansion factor M (over the specific test inputs used). In phase three, the value of the expansion factor M, for which the desired probability of correct execution has been measured, is used for subsequent executions of the program. At this stage, with no replicas and an empirical model for the likelihood of an ideal runtime environment execution, a program implementation with predictable level of robustness at a specific level of memory overhead can be deployed.

Exemplary Methods for Parameterizing a Randomized Memory Manager

In one exemplary embodiment, parameters that define the behavior of a randomized memory manager (e.g., one described with reference to FIGS. 12 and 13) can be specified to configure a randomized memory manager's functionality. Thus, for instance, once a particular combination of a heap expansion factor M (e.g., 915 in FIG. 9A), a number of replicas (e.g., 1201-1204 in FIG. 12) of a program and the randomization seeds (e.g., 1215-1218) is found to yield successful executions of a program, this configuration could be save and replicated. The parameters for such a configuration could be one or more of the following:

Heap expansion factor—M: integer. In this example, the heap expansion factor M is supplied as a configuration parameter (e.g., by a configuration manager (e.g., 410 of FIG. 4). In this case, a parameterized memory manager (e.g., 435A in FIG. 4) uses the expansion factor M to initialize the heap and allocate memory on the heap in a randomized manner as described above. For example, if M=3, then a heap is initialized that is three times larger than the heap needed assuming that the objects in the heap are packed perfectly. When the randomized memory manager is running, the random seed (e.g., 1215-1218 in FIG. 12) used to initialize it can either be determined randomly, or specified as another configuration parameter (see below).

Process replication factor—N: integer. In this example, the program replication factor N is supplied as a configuration parameter. In this case, a configuration executor (e.g., 420 in FIG. 4) uses the N factor to launch number N of replicas (e.g., 1221-1224 in FIG. 12) for executing a program. For example, if N=4, then four replicas are started. When the randomized memory manager is running on each replica, the random seed used to initialize it can either be determined randomly, or specified as another configuration parameter (see below).

Randomized memory manager seed—S: Integer (one or more). In this example the random initialization seed (e.g., 1215-1218) is supplied as a configuration parameter. In this case, parameterized memory manager (e.g., 435A in FIG. 4) uses the random seed (e.g., 1215-1218) specified as a configuration parameter to configure a randomized memory manager.

Thus, in one exemplary embodiment, the configuration (e.g., 110 in FIG. 1) for configuring a memory manager comprises a coordinate such (M, N, S), which could be associated with a randomized memory manager empirically found to have been successful. The methods described above provide a way for defining the behavior of such a randomized memory manager.

Exemplary Configuration Parameters

For the sake of convenience, the discussion above regarding parameterized memory managers used exemplary parameters of memory allocation padding by an integer value and deferring of frees by an integer value. However, parameters for defining the behavior of parameterized memory mangers are not limited to these two parameters. Other parameters can be used. The following paragraphs list some of the possible parameters that could be used and also discuss the set of values they might take on. These are, however, just examples that are indicative of the kinds of approaches that could be taken.

Allocation Padding—F:float: Indicates how many bytes are used to pad each object expressed as a percentage of the object's size. Thus, a value of 150 would pad each object with additional memory that is 150% of the size of the original object. For example, an object of size 8 bytes would be given 20 bytes of space.

Selective Application: in these methods, only a subset of all objects would have padding added or have frees be deferred Time-based selection—N-M: range of integer: In this example, only objects allocated in a particular window of time (e.g., measured by wall-clock time, central processing unit time, and time as measured by counting the number of object allocations). For example, the value 1-1000 for this parameter might indicate that only objects in the first 1000 allocations would be padded and would have frees deferred.

Type-based selection—sym: type: in this case, padding and deferring are selectively applied to objects of a specific type (e.g., indicated by the value of the parameter).

Instance-based selection—instance: integer: in this case, a specific instance of an object could be padded or deferred. For example, the value 305 could indicate that the $305^{th}$ object allocated by the program should be padded or have its frees deferred.

Code-based selection—f:function or module: in this case, padding and deferring are applied based on where in the code the object is allocated. For example, if the value of the parameter was "foo", it would signify the objects allocated in function foo should have padding added and have frees deferred.

Exemplary System Architecture

FIGS. 4 and 7 show configuration manager 410 and the configuration executor 420 as logically distinct. How the actual functionality is separated depends on the specifics of a desired implementation. For example, in a test environment, where the software is under development and not yet deployed, the configuration manager 410 and configuration executor 420 may be implemented on the same computer system and also possibly within the same process. Each executing instance of a program (e.g., 430A-C of FIGS. 4 and 7) may be executing on the same system, as well.

In the case where the program instance (e.g., 430A-C of FIGS. 4 and 7) is deployed on a customer machine, the configuration manager 410 will likely run on a completely different machine and each instance of the program (e.g., 430A-C) in the configuration executor 420 will run on a different customer's machine. In this case, the configurations distributed by the distributor 440 and the results collected by the configuration evaluator 450 are communicated across a network.

In another instance, the configuration manager can be linked directly to an application and executed entirely on the machine that the application executes on. In this instance, the configuration manager is part of the application's runtime system and executes before the application executes, at application startup. At startup, the configuration manager uses locally stored information (from, for example a file in the file system), to determine an appropriate configuration for the parameterized memory manager. The application then executes with the parameterized memory manager with the specified configuration, and terminates either correctly or incorrectly. In either case, at application termination, the parameterized memory manager writes additional information to the configuration manager's local permanent store (i.e., a file) recording information such as what configuration was used and whether the execution was successful. Thus, as the application is executed repeatedly, the information in the configuration manager's store accumulates just as it would in the other instances described. As the information accumulates, the configuration manager determines what the best configurations are and when additional configurations should be evaluated.

Exemplary Computing Environment

Figure 14:
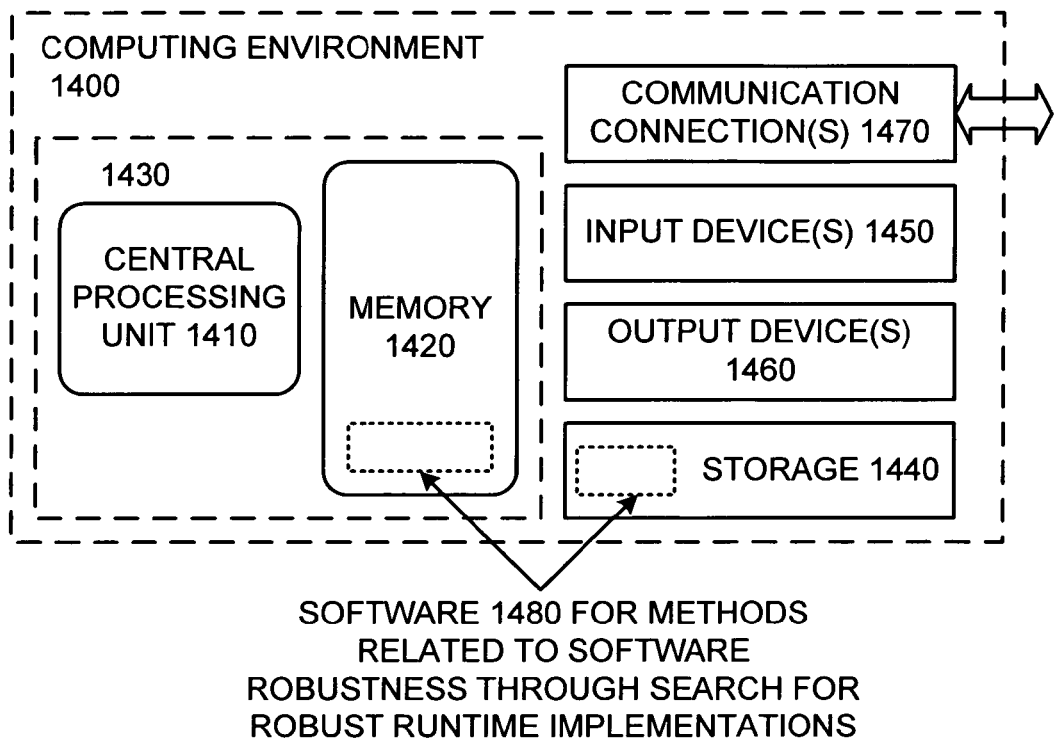
FIG. 14 is a block diagram illustrating an exemplary computing environment for implementing the methods of achieving software robustness through search for robust runtime implementations.

FIG. 14 and the following discussion are intended to provide a brief, general description of an exemplary computing environment in which the disclosed technology may be implemented. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 14 illustrates a generalized example of a suitable computing environment 1400 in which described embodiments may be implemented. The computing environment 1400 is not intended to suggest any limitation as to scope of use or functionality of the technology, as the present technology may be implemented in diverse general-purpose or special-purpose computing environments.

With reference to FIG. 14, the computing environment 1400 includes at least one central processing unit 1410 and memory 1420. In FIG. 14, this most basic configuration 1430 is included within a dashed line. The central processing unit 1410 executes computer-executable instructions and may be a real or a virtual processor. In a multi-processing system, multiple processing units execute computer-executable instructions to increase processing power and, as such, multiple processors can be running simultaneously. The memory 1420 may be volatile memory (e.g., registers, cache, RAM), non-volatile memory (e.g., ROM, EEPROM, flash memory, etc.), or some combination of the two. The memory 1420 stores software 1480 implementing the described methods for achieving software robustness through search for robust runtime implementations. A computing environment may have additional features. For example, the computing environment 1400 includes storage 1440, one or more input devices 1450, one or more output devices 1460, and one or more communication connections 1470. An interconnection mechanism (not shown), such as a bus, a controller, or a network, interconnects the components of the computing environment 1400. Typically, operating system software (not shown) provides an operating environment for other software executing in the computing environment 1400, and coordinates activities of the components of the computing environment 1400.

The storage 1440 may be removable or non-removable, and includes magnetic disks, magnetic tapes or cassettes, CD-ROMs, CD-RWs, DVDs, or any other medium which can be used to store information and which can be accessed within the computing environment 1400. The storage 1440 stores instructions for the software 1480 implementing methods of achieving software robustness through search for robust runtime implementations.

The input device(s) 1450 may be a touch input device, such as a keyboard, mouse, pen, or trackball, a voice input device, a scanning device, or another device, that provides input to the computing environment 1400. For audio, the input device(s) 1450 may be a sound card or similar device that accepts audio input in analog or digital form, or a CD-ROM reader that provides audio samples to the computing environment 1400. The output device(s) 1460 may be a display, printer, speaker, CD-writer, or another device that provides output from the computing environment 1400.

The communication connection(s) 1470 enable communication over a communication medium to another computing entity. The communication medium conveys information, such as computer-executable instructions, compressed graphics information, or other data in a modulated data signal.

Computer-readable media are any available media that can be accessed within a computing environment 1400. By way of example, and not limitation, with the computing environment 1400, computer-readable media include memory 1420, storage 1440, communication media (not shown), and combinations of any of the above.

In view of the many possible embodiments to which the principles of the disclosed technology may be applied, it should be recognized that the illustrated embodiments are only preferred examples of the technology and should not be taken as limiting the scope of the following claims. We therefore claim all that comes within the scope and spirit of these claims.

The disclosed technology is directed toward novel and unobvious features and aspects of the embodiments of the system and methods described herein. The disclosed features and aspects of the embodiments can be used alone or in various novel and unobvious combinations and sub-combinations with one another. Although the operations of the disclosed methods are described in a particular, sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "determine" to describe the disclosed methods. Such terms are high-level abstractions of the actual operations that are performed. The actual operations that correspond to these terms will vary depending on the particular implementation and are readily discernible by one of ordinary skill in the art.

We claim:

1. A computer implemented method for improving robustness of a software program execution by masking runtime memory safety errors, the method comprising:
    using a computer, conducting a search for ideal configurations of parameters for defining functionality of a parameterized memory manager of a runtime heap; and
    identifying at least one ideal configuration for defining the parameterized memory manager that masks at least some memory safety errors.

2. The method of claim 1 wherein the parameterized memory manager configured with the at least one ideal configuration is an approximation of an infinite heap memory manager.

3. The method of claim 1 wherein at least one of the parameters for defining functionality of the parameterized memory manager defines an amount of padding to be added to requests for allocation of memory on the heap.

4. The method of claim 1 wherein at least one of the parameters for defining functionality of the parameterized memory manager specifies amount of deferment in executing calls for freeing memory on the heap previously allocated to objects.

5. The method of claim 1 wherein conducting the search for the ideal configurations comprises:
    enumerating possible configurations of the parameters within a given bounded coordinate space;
    applying at least some of the enumerated configurations to the parameterized memory manager in conjunction with executions of instances of the software program;
    identifying the enumerated configurations that result in successful execution of the software program; and
    selecting at least one of the successful enumerated configurations as the ideal configuration.

6. The method of claim 5 wherein identifying the enumerated configurations that result in successful execution comprises comparing outputs resulting from executions conducted according to the enumerated configurations to an output resulting from an execution conducted according to a generous configuration approximating an infinite heap memory manager.

7. The method of claim 1 wherein conducting the search for the ideal configurations comprises:
    selecting at least one configuration point in configuration coordinate space of the parameters for defining the functionality of the parameterized memory manager;
    applying the selected configuration to the parameterized memory manager in conjunction with an execution of the software program;
    evaluating whether the selected configuration results in a successful execution and is otherwise acceptable; and
    conducting an iterative search of the configuration coordinate space until at least one configuration that is successful and acceptable is selected as the ideal configuration for defining the parameterized memory manager that masks at least some memory safety errors.

8. The method of claim 7, wherein the successful execution is determined by comparing output of the execution with an output resulting from an execution conducted according to a generous configuration approximating an infinite heap memory manager.

9. The method of claim 1 wherein conducting the search for the ideal configurations comprises:
    receiving data related to success or failure of executions of a plurality of deployed instances of the software program running with a plurality of configurations of the parameters for defining the functionality of their respective parameterized memory manager; and
    based on statistically correlating the data related to success or failure of the executions with the plurality of configurations, identifying at least one of the configurations as the ideal configuration for defining the parameterized memory manager that masks at least some memory safety errors.

10. The method of claim 9 wherein at least some of the plurality of deployed instances of the software program are running on the same computer system with the same inputs.

11. The method of claim 9 wherein at least some of the plurality of deployed instances of the software program are running on different computer systems with the different inputs.

12. A computer system for conducting a search for ideal configurations of parameters for defining functionality of a parameterized memory manager of a runtime memory heap that masks at least some runtime memory safety errors in a software program, the computer system comprising:
    a configuration manager operable for generating configurations selected from configuration coordinate space of parameters for defining functionality of the parameterized memory manager of the runtime heap; and
    a configuration executor operable for executing a plurality of instances of the software program according to the selected configurations and providing results of the executions to the configuration manager, wherein the configuration manager is further operable for evaluating the results of the executions to determine at least one of the selected configurations as the ideal configuration that masks at least some runtime memory safety errors.

13. The computer system of claim 12 wherein the configuration manager comprises:
    a configuration generator for generating the configurations selected from configuration coordinate space of parameters for defining functionality of the parameterized memory manager; and
    a configuration evaluator for evaluating the results of the executions to determine the ideal configuration that masks at least some runtime memory safety errors.

14. The computer system of claim 12 wherein generating configurations selected from configuration coordinate space of parameters for defining functionality of the parameterized memory manager of the runtime heap comprises, enumerating possible configurations of the parameters within a given bounded coordinate space.

15. The computer system of claim 12 wherein generating configurations selected from configuration coordinate space of parameters for defining functionality of the parameterized memory manager of the runtime heap comprises, iteratively searching the configuration coordinate space until at least one configuration that is successful and acceptable is selected as the ideal configuration for defining the parameterized memory manager that masks at least some memory safety errors.

16. The computer system of claim 12 wherein the plurality of instances of the software program are deployed instances of the software program and evaluating the results of the executions to determine at least one of the selected configurations as the ideal configuration comprises statistically correlating the data related to success or failure of the executions of the deployed instances of the software program with plurality of configurations associated therewith.

17. The computer system of claim 12 wherein at least one of the parameters for defining functionality of the parameterized memory manager defines an amount of padding to be added to allocations of memory on the heap, wherein the amount of padding is specified as a percentage increase of a size of memory requested for each object.

18. The computer system of claim 12 wherein at least one of the parameters for defining functionality of the parameterized memory manager specifies an identifier for identifying code portions of the software program to which the parameterized memory manager is to be applied.

19. The system of claim 12 wherein at least one of the parameters for defining functionality of the parameterized memory manager comprises an identifier of type of object to which the parameterized memory manager is to be applied.

20. At least one computer-readable memory and/or storage medium useful in conjunction with a computer, the computer comprising at least one processor and memory, the computer-readable medium having stored thereon computer executable instructions for improving robustness of a software program execution by masking runtime memory safety errors, the method comprising:
  conducting a search for ideal configurations of parameters for defining functionality of a parameterized memory manager of a runtime heap, and
  identifying at least one ideal configuration for defining the parameterized memory manager that masks at least some memory safety errors; and
  applying the at least one ideal configuration to the parameterized memory manager during an execution of the software program.

21. A computer implemented method for improving robustness of a software program execution by masking runtime memory safety errors, the method comprising:
  using a computer, conducting a search for ideal configurations of parameters for defining functionality of a randomized memory manager of a runtime heap, and
  identifying at least one ideal configuration for defining the randomized memory manager that masks at least some memory safety errors; and
  applying the at least one ideal configuration to the randomized memory manager during an execution of the software program.

22. The method of claim 21 wherein at least one of the parameters for defining functionality of the randomized memory manager specifies a expansion factor for defining an approximation of an infinite heap.

23. The method of claim 21 wherein at least one of the parameters for defining functionality of the randomized memory manager specifies a number of replicas of the software program to be executed.

24. The method of claim 21 wherein at least one of the parameters for defining functionality of the randomized memory manager specifies a random number seed for the randomized memory manager.

25. The method of claim 1, further comprising applying the at least one ideal configuration to the parameterized memory manager during an execution of the software program.

26. A method, comprising:
  using a first computer, enumerating a plurality of parameter configurations within a given bounded coordinate space for defining functionality of a parameterized memory manager of a runtime heap;
  distributing the plurality of parameter configurations to one or more second computers;
  collecting results from the one or more second computers, the collected results comprising outputs from instances of a software program executed in conjunction with parameterized memory managers configured according to the plurality of parameter configurations;
  comparing the collected results to an output resulting from an execution of the software program conducted according to a generous parameter configuration approximating an infinite heap memory manager; and
  selecting at least one of the plurality of parameter configurations as an ideal parameter configuration.

* * * * *